United States Patent

[11] 3,574,283

| [72] | Inventor | William R. Albers |
| | | 3615 Libo Place, Fairfax, Va. 22030 |
| [21] | Appl. No. | 693,779 |
| [22] | Filed | Dec. 27, 1967 |
| [45] | Patented | Apr. 13, 1971 |

[54] NUMERIC COLLIMATED DISPLAY INCLUDING MEANS FOR PROJECTING ELEVATION, ATTITUDE AND SPEED INFORMATION
5 Claims, 17 Drawing Figs.

[52] U.S. Cl. .................................................. 73/178,
343/108, 350/174, 356/251
[51] Int. Cl. ....................................................G02b 23/10,
G02b 27/14, G01c 21/00
[50] Field of Search......................................... 356/252;
350/174; 343/108; 73/178; 356/251

[56] References Cited
UNITED STATES PATENTS

| 2,887,927 | 5/1959 | Newton.......................... | 356/252 |
| 2,932,024 | 4/1960 | Sant Angelo.................. | 343/108 |
| 2,941,400 | 6/1960 | Nesbitt.......................... | 73/178 |
| 2,943,482 | 7/1960 | Fritze et al..................... | 73/178 |
| 3,005,185 | 10/1961 | Cumming et al.............. | 340/27 |
| 3,060,405 | 10/1962 | Buon.............................. | 340/26 |
| 3,085,427 | 4/1963 | Majendie....................... | 73/136 |
| 3,094,971 | 6/1963 | Guarino et al................. | 116/129 |
| 3,128,623 | 4/1964 | Gold............................... | 73/178 |
| 3,162,834 | 12/1964 | Schweighafer................ | 340/27 |
| 3,280,625 | 10/1966 | Birmingham.................. | 73/178 |

*Primary Examiner*—Ronald L. Wibert
*Assistant Examiner*—Orville B. Chew, II
*Attorney*—Strauch, Nolan, Neale, Nies and Kurz

ABSTRACT: A simulated visual reference collimated heads-up display system for aircraft pilots arranged in the pilot's normal line of sight through the windshield and utilizing the established basic theories and principals of flight enabling a pilot, even an inexperienced pilot, to fly safely and with precision, maintaining good air speed and attitude control in clear visual reference flying weather or in instrument or marginal weather conditions. The system employs reticle plate images projected on a screen disposed in the pilot's normal line of vision and comprising a horizon line image slaved to the aircraft's gyro horizon instrument; an attitude circle image fixedly related to the vertical centerline of the screen for selective positioning along the vertical centerline of the screen to depict the optimum nose attitude of the aircraft to be maintained for a selected mode of flight; a small airplane image fixedly related to the display screen and to the aircraft to depict the instantaneous pitch and bank attitudes and heading of the aircraft during all phases of flight including the takeoff and landing runs of the aircraft so the pilot can center the small airplane image in the attitude circle to establish the optimum nose attitude of the aircraft during any selected mode of flight; air speed and vertical speed line images pivoted to swing up and down about the ends of the wings of the small airplane image and slaved to the aircraft's air speed and vertical speed instruments to indicate deviations from the optimum air speed and rate-of-climb or descent to be maintained at a selected mode of flight depicted by lateral alignment of the swinging line images to the respective wing portions of the small airplane image; an altitude display slaved to the aircraft's altimeter in a manner to move up or down over the screen when a deviation of selected magnitude in either direction from a preselected altitude to be maintained in a selected mode of flight occurs, and also arranged to indicate arrival at a planned or assigned altitude when climbing or on descent this indication being given by the altitude display moving up or down over the display screen, and also arranged to indicate arrival at the prescribed ILS minimum altitude when making an ILS (Instrument Landing System) approach to a landing; a yaw display slaved to the aircraft's yaw rate gyro system in a manner to move in from the right or in from the left over the screen when yawing of the aircraft occurs; a direction line image vertically related to the screen and selectively slaved to a compass and a compass bug settable to a desired heading by the pilot or to the Omnisignal or Localizer signal of the aircraft's Omnireceiver or Localizer receiver so the pilot can steer the small airplane image to laterally center it on the direction line image to maintain the selected heading; and an ILS circle image slaved to follow the indications of the aircraft's standard cross-pointer indicator instrument arranged to replace the attitude circle image when the pilot wants to make an ILS instrument landing approach and have the simulated visual reference flying display for guidance in maintaining optimum instrument flight using the same reference images and procedures.

PATENTED APR 13 1971

INVENTOR
William R. Albers

BY 
ATTORNEYS

INVENTOR
William R. Albers
BY Strauch, Nolan, Neale, Nies & Kurz
ATTORNEYS

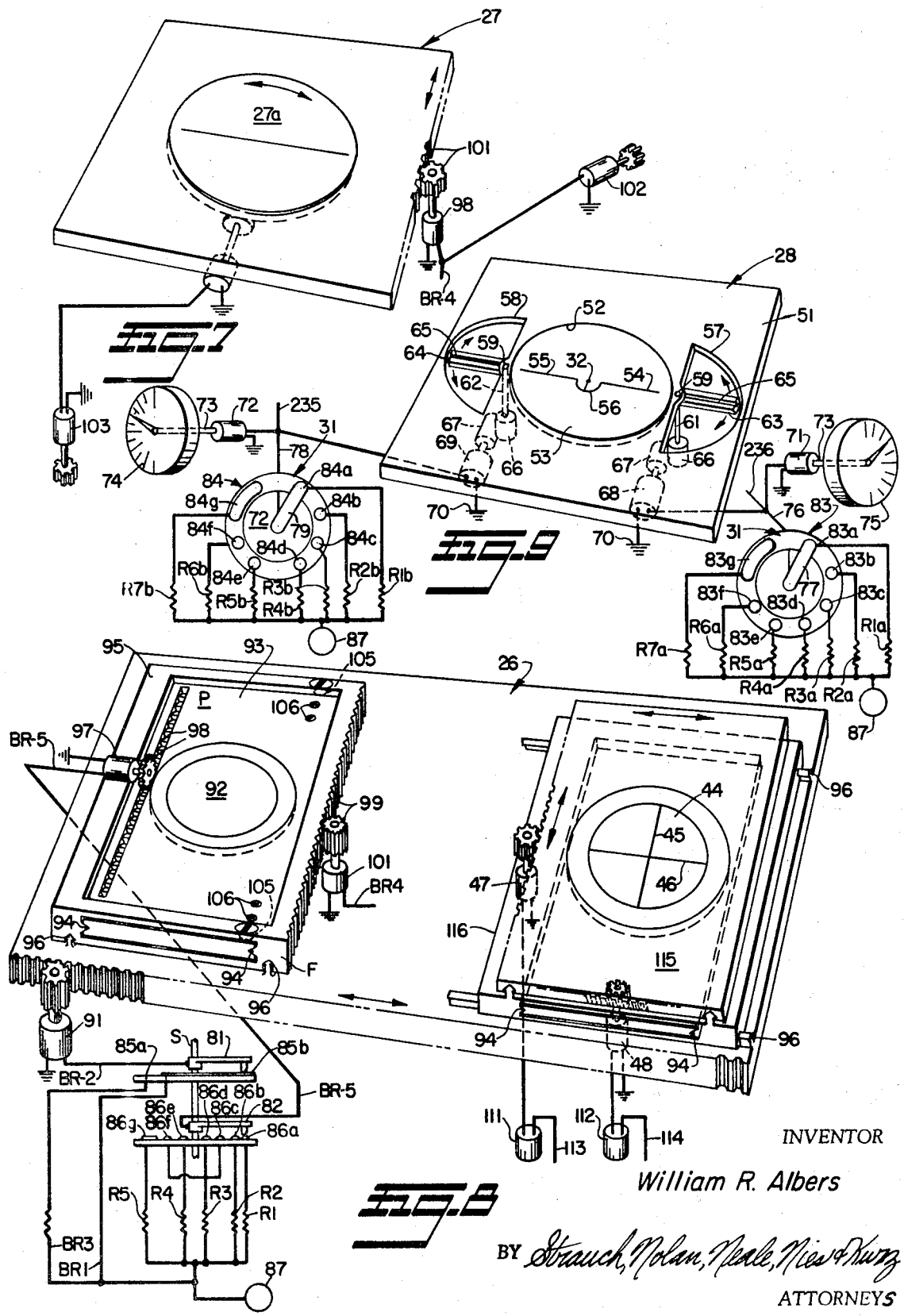

PATENTED APR 13 1971  3,574,283
SHEET 4 OF 7
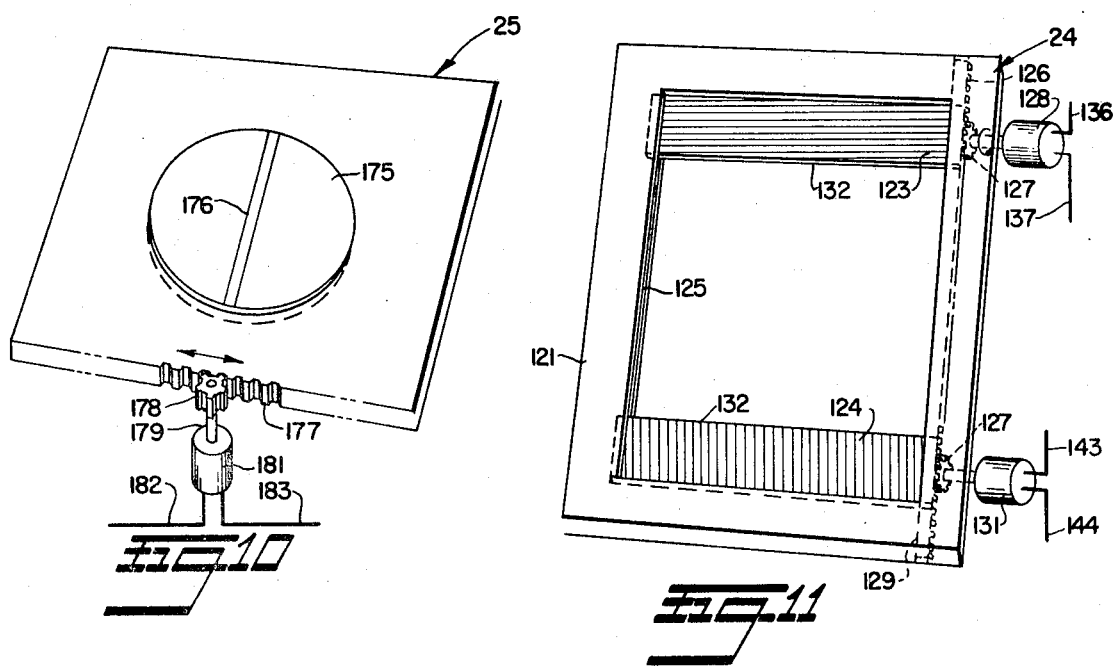
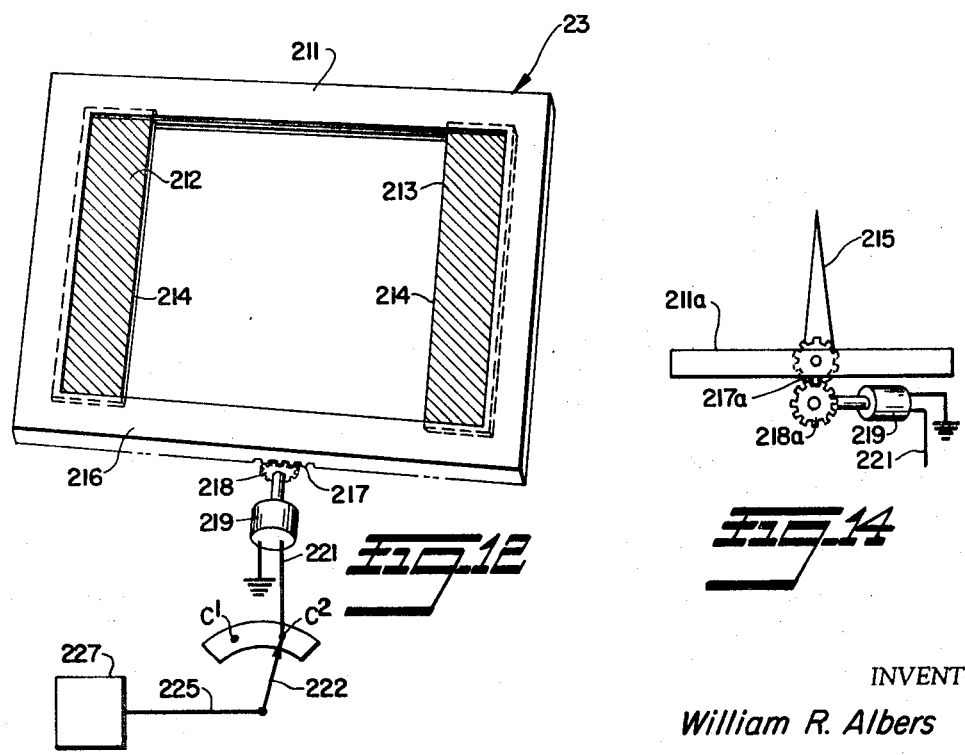
INVENTOR
William R. Albers
BY Strauch, Nolan, Neale, Nies & Kurz
ATTORNEYS

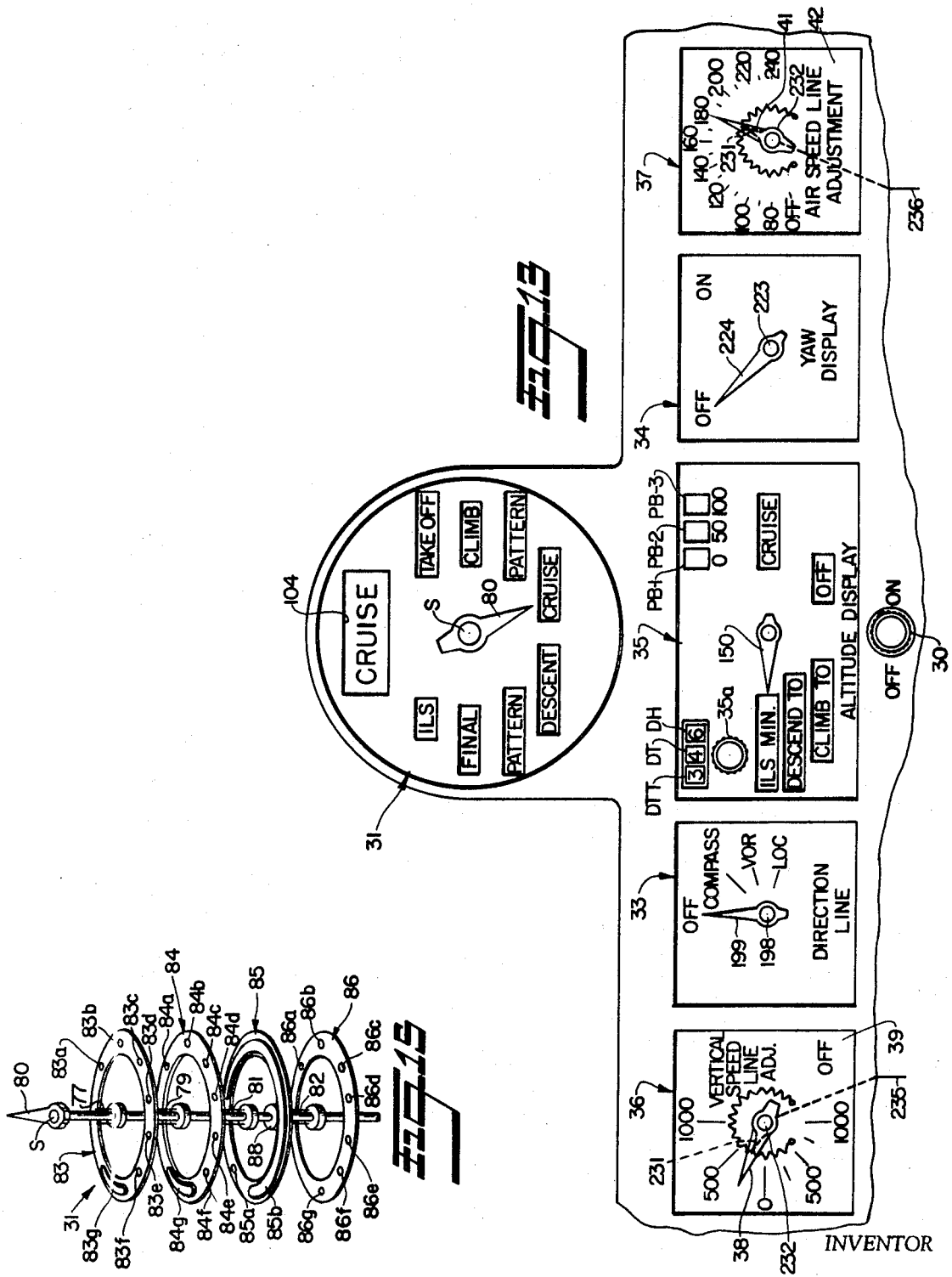

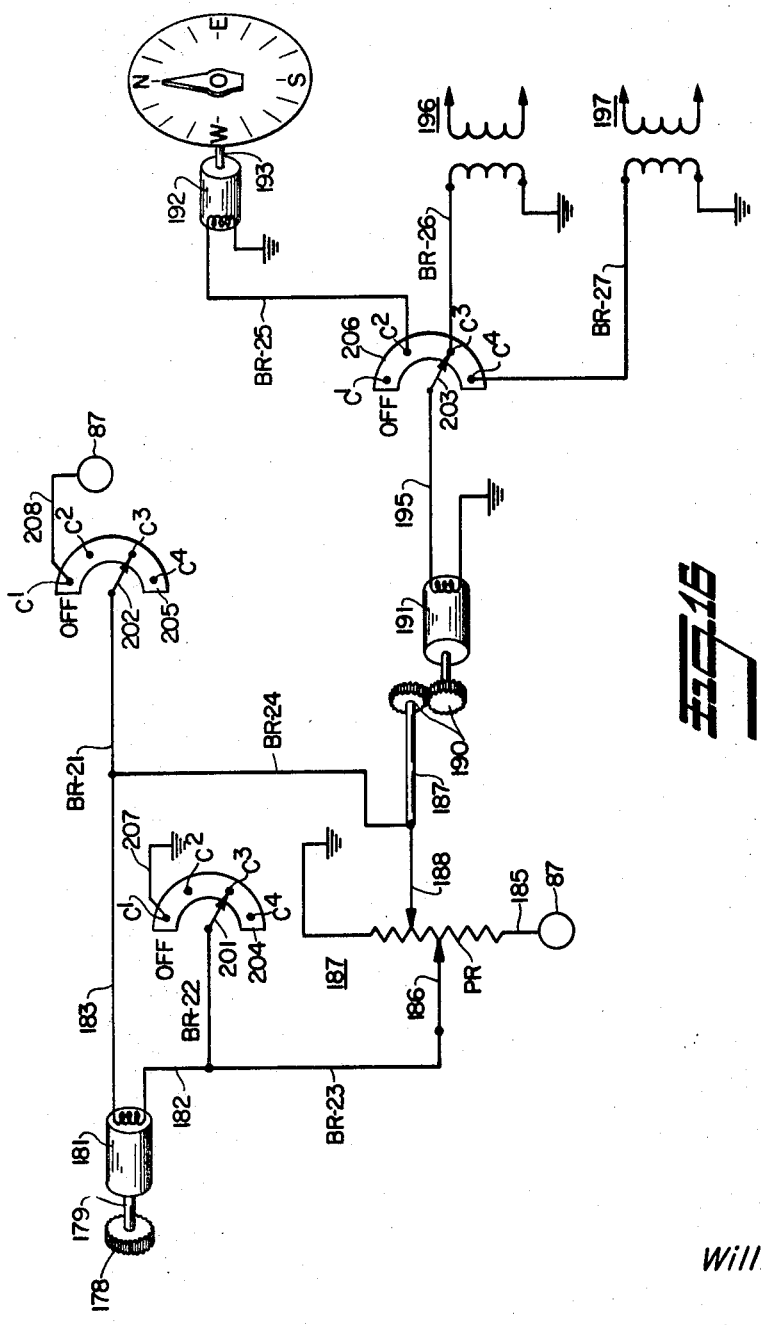

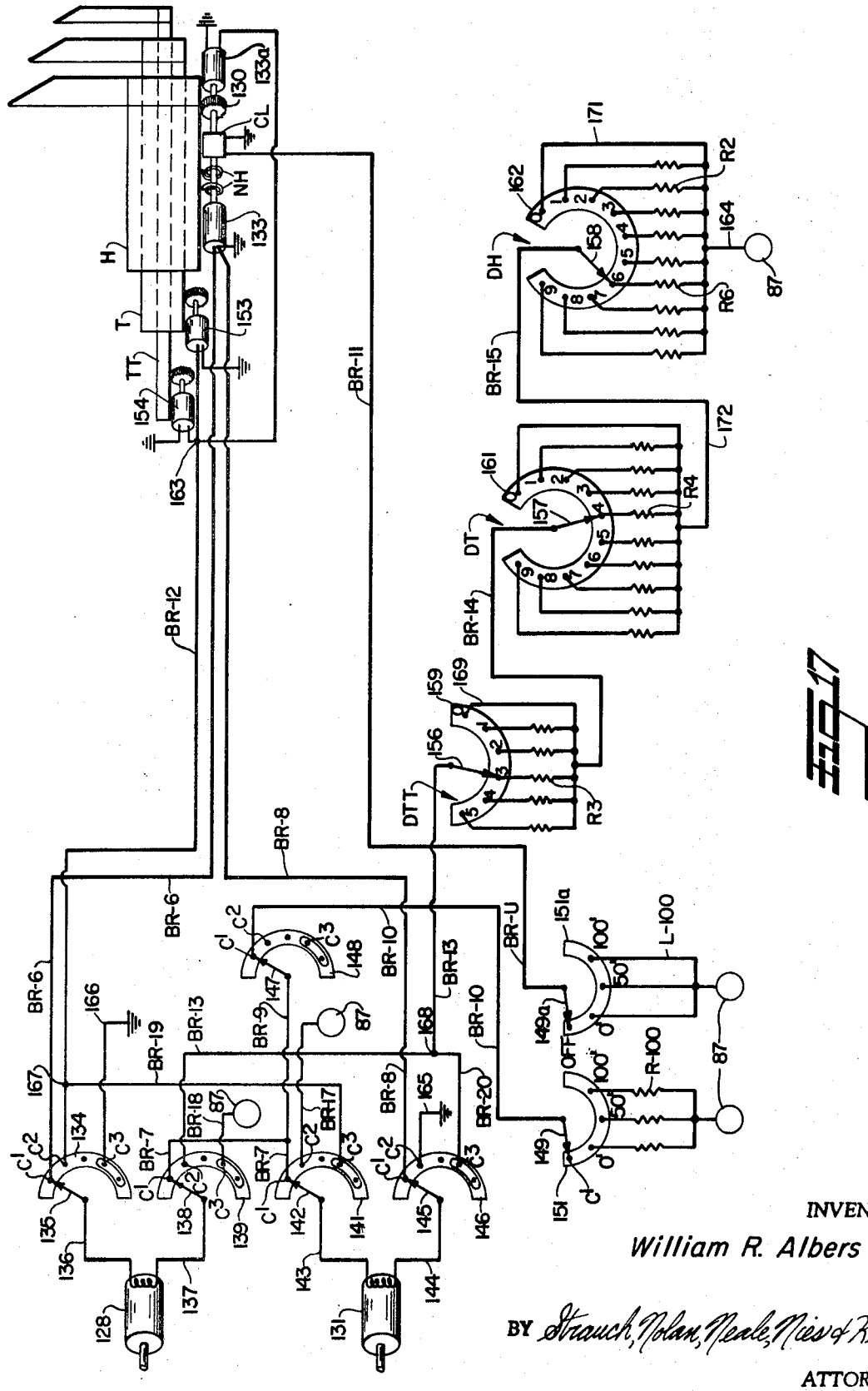

NUMERIC COLLIMATED DISPLAY INCLUDING MEANS FOR PROJECTING ELEVATION, ATTITUDE AND SPEED INFORMATION

BACKGROUND OF THE INVENTION

Attempts to provide visual reference flying aids through collimated displays disposed in the operator's normal field of vision have heretofore been proposed. Typical examples are shown by U.S. Letters Pat. No. 2,887,927 issued May 26, 1959, to J. C. Newton; 2,932,024 issued Apr. 5, 1960 to M. A. Sant Angelo; 2,941,400 issued June 21, 1960 to J. O. Nesbitt; 2,943,482 issued July 5, 1960 to E. H. Fritze et al.; 3,005,185 issued Oct. 17, 1961, to R. W. Cumming et al.; 3,060,405 issued Oct. 23, 1962, to G. A. Buon; 3,085,429 issued Apr. 16, 1963 to A. M. A. Majendie; 3,094,971 issued June 25, 1963, to L. S. Guarino et al.; 3,128,623 issued Apr. 14, 1964 to T. Gold; 3,162,834 issued Dec. 22, 1964 to H. M. Schweighofer et al.; and 3,280,625 issued Oct. 25, 1966 to H. P. Birmingham. These prior aids, for the most part, provide displays of only partial flight information to the pilot or displays which require either additional mental interpretation by the pilot or coordinated scanning of instrument panel mounted instruments in their usage. None of them provide the full information required by the pilot in all phases or modes of flight, none of them provide a dynamic and graphic relationship between the display and the attitude and maneuvers of the aircraft, and many of them provide displays which are not properly correlated to the established basic theories and principals of flight which the pilot is taught in his training for an aircraft pilot's license or for commercial flying.

The present invention provides a new and unique concept in instrument and precision flying which solves most, if not all, of the problems which have been found to be cause factors of most aviation accidents, such as, loss of control in transition from visual reference flying to instrument reference flying, low altitude stalls, undershooting or overshooting runways or landing strips, and other proficiency factors grouped under the identification "pilot error." It accomplishes this in a fully integrated and dynamic system providing simultaneous visual and instrument references that are simple and easy to learn since they utilize established basic theories and principals of flight, and which system will be relatively economical to produce.

SUMMARY OF INVENTION

It is a primary object of this invention to provide a visual reference flying system in the form of a collimated display imposed on the normal view of the pilot through the aircraft's windshield in proper correlation to the actual outside visual flying references that can be preset to establish optimum visual references for attitude, airspeed, rate of climb or descent, heading, altitude, and like reference and will instantaneously indicate deviations from these preset optimums in a manner that will be readily recognized by the pilot without the need of appreciable mental reflection or shifting his eyes from his normal line of vision to scan and evaluate information furnished by instrument panel flight instruments so that he can take early normal corrective action to compensate for such deviation or deviations.

A further important object of the present invention resides in the provision of image forming reticle plates correlated with one another in a collimating projector and also correlated with the aircraft in which the projector is mounted and slaved through synchrosystems to the aircraft's flight instruments to produce an integrated dynamic display on a screen in the pilot's normal line of vision through the windshield depicting the aircraft's instantaneous and continuous relation to the horizon, to a predetermined optimum mode of flight determined by a display of a small airplane image, a prepositioned attitude circle image, a predetermined airspeed indication image, a predetermined vertical speed indication image, a predetermined direction line image, an altitude display movable onto the screen at the top or bottom when a predetermined deviation in either direction from a preselected altitude occurs and which also indicates reaching a planned or assigned altitude when climbing or descending, and signals the pilot when the prescribed minimum allowable altitude is reached during an ILS instrument approach to a landing, and a yaw display movable onto the screen at one side or the other when a deviation in either direction from balanced flight occurs due to skidding or slipping.

Still another object of the present invention resides in providing in the visual reference flying system of this invention a visual flying reference in the form of the ILS circle that can be substituted for the preset optimum visual attitude reference when it is desired to execute an ILS instrument approach to a landing.

A further object of the present invention resides in dynamically correlating the image forming reticle plates forming the airspeed indication image and the vertical speed indication image to the small airplane image of the aircraft's instantaneous relation to the horizon so that the airspeed image will appear as a line swinging or pivoting up or down about one wing tip of the small airplane image of the aircraft's instantaneous relation to the horizon and the vertical speed image will appear as a line swinging or pivoting up or down about the other wing tip, with all three images arranged to move in concert and in the same direction in response to changes in the aircraft's flight attitude, airspeed, and vertical speed.

The present invention forms the display in front of the pilot at infinity, i.e. it will appear to the pilot to be out in front of him at a distance and superimposed on any object he is looking at out in front of the aircraft, for example, the landscape and horizon or in landing approaches the runway or landing strip. The system display is preferably always on, whether flying visual flying reference or instrument flying reference and the intensity or brilliance of the display can be adjusted to a comfortable level by the pilot. In clear weather the pilot controls the aircraft by visual reference to the ground and horizon, in the usual manner, and is also simultaneously aware of the aircraft's attitude by reference to the display depicting optimum flight conditions. The horizon line image will normally coincide with the true horizon and the small airplane image will normally appear in the pilot's vision without any need to focus on either while the pilot is scanning the true horizon. In effect, he will be flying by simultaneous reference to the true horizon and to the horizon line image. Out to each side of the small airplane image at a comfortable position in his peripheral field of vision, the pilot will be aware of the airspeed and vertical speed images and by their correlated up or down swinging movements (upward movement of the aircraft's nose above the horizon resulting in the small aircraft image's nose rising above the horizon line image denoting a climbing attitude being accompanied by an upward swinging of the airspeed line image denoting a decaying airspeed and a simultaneous upward swinging movement of vertical speed line image denoting an increasing rate of climb and, conversely all three images moving downward when the aircraft's nose is lowered) will be easily, immediately, and constantly aware of deviations requiring normal adjustment of the aircraft's controls to permit maintenance of precision flying conditions which he has selected by preadjustment of the mode selector switch provided in the system. In the case of decreasing visibility of ground references or rapid variations in visibility of ground references the display references will remain prominent enabling him to instantaneously make the transition from normal visual reference flying to instrument reference flying and back without the necessity of transition to instrument panel flight instruments. As a consequence, the loss of time and fatiguing mental effort required in presently available systems is eliminated. The need for corrective maneuvering of the controls will be immediately signalled by the display which enables the pilot to constantly fly by visual reference and instrument reference. Even when flying by visual reference in clear weather and not consciously paying attention to the display the pilot will be signalled of flight deviations on a subliminal level. The transition from one system of references to the other presents the pilot with a familiar, easy and natural situation, a tremendous advantage in preventing confusion, panic, erroneous corrective action, overcorrection, or rapid departure from optimum flight conditions which often occur during such transition in present flight control systems. The early and constant signalling provided by the display system of this invention assures ample time for gradual corrective action leading to smoother, safer flying, peace of mind so far as the pilot is concerned, and substantial reduction of the pilot fatigue factor which plays a part in aircraft accidents.

BRIEF DESCRIPTION OF THE DRAWINGS

Further objects will appear from the following description and appended claims when read in conjunction with the accompanying drawings wherein:

FIG. 7 is a schematic view of the horizon line reticle plate employed in the collimating and projection lens system of the present invention shown mounted under and behind the instrument panel in FIG. 1;

FIG. 8 is a schematic view of the attitude circle reticle plate and the ILS circle reticle plate employed in the collimating and projection lens system of the present invention;

FIG. 9 is a schematic view of the combined small airplane, airspeed line, and vertical speed line reticle plate employed in the collimating and projection lens system of the present invention;

FIG. 10 is a schematic view of the vertically oriented direction line reticle plate employed in the collimating and projection lens system of the present invention;

FIG. 11 is a schematic view of the altitude limits reticle plate employed in the collimating and projection lens system of the present invention;

FIG. 12 is a schematic view of the yaw display reticle plate employed in the collimating and projection lens system of the present invention; and FIG. 13 is an enlarged face view of the flight mode selector switch panel which is mounted at the top of the aircraft's instrument panel shown in FIG. 1;

FIG. 14 is a schematic view of the alternate yaw display reticle plate which can be employed in the system in place of the one depicted in FIG. 12;

FIG. 15 is a schematic view of the flight mode selector switch;

FIG. 16 is a schematic wiring diagram for the direction line reticle; and

FIG. 17 is a schematic wiring diagram for the altitude display reticle;

DESCRIPTION OF PREFERRED EMBODIMENT

Figure 1:
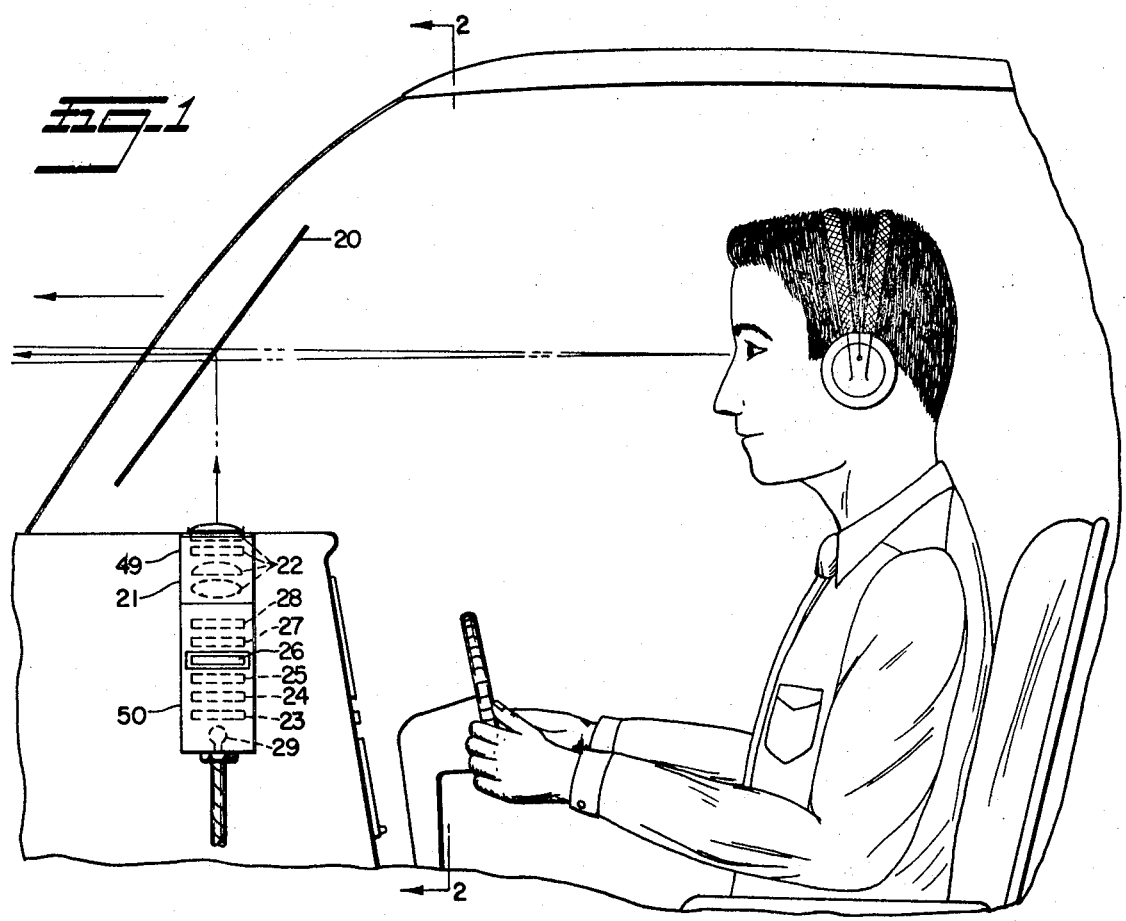
FIG. 1 is a schematic longitudinal sectional view of the cockpit of an aircraft equipped with the flight control system of the present invention.

With continued reference to the drawings wherein like reference numerals are employed throughout the several views to indicate the same parts, the basic system of the present invention employs a large rectangular screen of transparent glass or plastic 20 serving as a reflector screen fixedly mounted at a 45° rearward angle to the vertical in back of the windshield in the normal line of vision of the pilot, a collimating projector or projectors 21 including a lens system 22 for projecting the images formed by the various transparent glass or plastic reticle plates 23 through 28 as lines of light on reflector plate 20, a high intensity electric bulb or bulbs 29 behind the reticle plates provided with an on-and-off switch 30, including a rheostat for energizing and controlling the intensity of the light sources to accommodate varying conditions of daytime and nighttime illumination, and which also energizes the control circuitry for the system display through the input circuits to the power input contacts of the mode selector switch 31, and the input circuits of switches 33, 34, 35, 36 and 37, pushbuttons PB-1, PB-2, PB-3, digital selector switch 35d when the optional displays provided thereby are employed, and the synchrocircuits for the horizon line reticle 27 which is directly slaved to the gyrocompass and usually an ILS circle reticle 44 (FIG. 8) directly connected to the aircraft's glide slope receiver and localizer receiver conventionally installed on the aircraft. The lines of light are projected at infinity to the pilot's eyes, i.e., the images are focused at infinity in the usual manner of collimated heads-up visual display systems. The image arrangement of this invention provides a unique display composed of a movable horizon line image H directly slaved through Autosyn synchros or the like to move in accordance with the vertical and banking movements of the horizon bar of the aircraft's gyro horizon instrument; a small airplane image A, with long wings so that it is much wider than the small airplane of the average gyro horizon instrument, fixedly related to the fuselage and to the center of the display screen 20 together with an airspeed line image C slaved through flight mode selector switch 31 and Autosyn synchros or the like to follow the movements of the pointer of the aircraft's airspeed indicator and arranged to rotate or pivot about the right wing end of the small airplane image A and a vertical speed line image B slaved through flight mode selector switch 31 and Autosyn synchros or the like to follow the movements of the pointer of the aircraft's vertical speed indicator (or alternatively the instantaneous vertical speed indicator if the aircraft is so equipped) and arranged to rotate or pivot about the left wing end of the small airplane image A; an attitude circle image D located in the vertical centerline of the display and which is manually preset by the pilot through the flight mode selector switch 31 to various positions above, on, or below horizon line image H to establish the optimum flight pitch attitude of the aircraft that should be maintained relative to the movable horizon line H for the particular mode of flight selected by the pilot and electrically slaved to the horizon line reticle to maintain its relative preset relation to horizon line H throughout all angular pitch positions and movements of the horizon line and preferably an ILS circle image (see reticle 44, FIG. 8) which is cut into the display in place of attitude circle image D when flight mode selector switch 31 is in its ILS position slaved through Autosyn or like synchros to the outputs of the aircraft's glide slope receiver and the aircraft's localizer receiver to follow and display the standard ILS crosspointer instrument when the aircraft employs instrument reference flying procedures; a vertically oriented direction line image E (FIG. 2) slaved through flight mode selector switch 31 and Autosyn synchros or the like to a compass and compass bug settable by the pilot to a desired heading or alternatively to the Omnisignal or Localizer signal of the Omnisignal Receiver or the Localizer receiver of the aircraft; an altitude display image F (FIG. 2), including a low limit indication band of a distinctive color (preferably red) and a high limit indication band (preferably blue or green) controlled by respective synchroreceiver motors adapted through suitable biasing circuits and multithrow switch 35 to be (a) connected in series and slaved through a synchrotransmitter motor driven by the hundreds-of-feet pointer shaft of the aircraft's conventionally provided altimeter or (b) independently slaved through a common multibranch lead to the three synchrotransmitter motors comprising respectively the aforesaid transmitter motor of the hundreds-of-feet altimeter pointer shaft, a second similar synchrotransmitter motor driven by the thousands-of-feet altimeter pointer shaft, and a third similar synchrotransmitter motor driven by the ten thousands-of-feet altimeter pointer shaft to function in the first instance to indicated altitude variations beyond a preselected variation from an assigned cruising altitude and in the latter instances to respectively indicate a "Descent To" and a "Climb To" a preselected altitude; and a yaw display image G (FIG. 2) which consists of two vertical bands of a distinctive color, preferably yellow, slaved through on-off switch 34 and Autosyn synchros or the like to follow the aircraft's gyro yaw rate system and selectively cut in to operate by the pilot when desired. Since certain aircraft normally are equipped to display the airspeed and vertical speed instruments at the opposite sides of the pilot, the images B and C may be reversely located if desired. A general description of the system's operation will be given at this time since the construction of the various reticle plates, their respective synchro or manual drives, and their arrangement relative to each other can be widely varied.

DESCRIPTION OF THE SYSTEM

The system display is always on whether the pilot is flying by visual reference (VFR) or by reference to instruments (IFR). The brightness of the display is adjusted to a comfortable level by the pilot by means of switch 30. When the flight mode selector switch 31, a multipole, multithrow switch electrically connected to the attitude circle reticle plate (see FIG. 15) is set to a particular phase of flight position it accomplishes the following things: The attitude circle image D is placed in a position in relation to the horizon line H which is the optimum correct nose-up or nose-down angle or attitude for that particular phase of flight this being accomplished by mechanically positioning the attitude circle reticle to a position which is predetermined for the particular type of aircraft being flown, rotates the airspeed line image C so that it will be laterally aligned with the right wing of the small airplane image A when the correct optimum airspeed is attained for that particular phase of flight for the particular type of aircraft being flown, this being accomplished by a multiple-pole, multiple-throw electrical switch operated by the flight mode selector switch 31 which connects into the airspeed Autosyn circuit an appropriate amount of bias resistance to the airspeed reticle servomotor causing it to rotate the appropriate amount necessary as schematically shown in FIG. 9, rotates the vertical speed line image B in a similar fashion so that it will be laterally aligned with the left wing of the small airplane image A when the correct rate-of-climb or rate-of-descent for the particular phase of flight is attained, this being accomplished by electrically connecting the appropriate amount of bias resistance to the vertical speed reticle servomotor as schematically shown in FIG. 9. Similar circuitry energized by mode selector switch 31 may be employed to locate the attitude circle image in proper relation to the horizon line image for the selected mode of flight although it is possible and may be preferable to provide a suitable mechanical drive to position the attitude circle.

TAKEOFF. The flight mode selector switch 31 is set to the takeoff position. This sets the attitude circle D in optimum position in relation to the horizOn line image H for takeoff with its center disposed to line up with the end of the runway as the aircraft starts its takeoff run for use as a sight, making it easier for the pilot to maintain directional control during his takeoff run disposing the attitude circle D in proper position to indicated the correct optimum takeoff nose angle for the particular aircraft in which the system is installed, and electrically connects the appropriate amount of bias resistance into the airspeed reticle servomotor circuit and into the vertical speed reticle servomotor circuit to allow the airspeed line and vertical speed line images to be laterally aligned at either end of the wings of the small airplane image when the correct takeoff airspeed and rate-of-climb are attained. As the takeoff run starts the airspeed and vertical speed image lines B and C pivoted at the opposite ends of the wings of the small plane reticle will be drooped downward. As the speed increases and the takeoff speed of the particular plane is reached airspeed line image C will rise to a position laterally aligned with the right wing of airplane image A signalling the pilot to raise the nose of the aircraft for liftoff, the pilot accomplishing this by raising the nose point 32 of small airplane image A to the center of attitude circle D at which time the pilot will observe the vertical speed line image moving upward to a position laterally aligned with the left wing of airplane image A the whole display now signalling the pilot that the optimum correct takeoff angle, airspeed and rate-of-climb of the particular plane are attained. The pilot then maintains his takeoff in the customary manner by visual observance through the screen 20 and the windshield while maintaining his airspeed by reference to airspeed image line C and his rate of climb by reference to the vertical speed line image B both within his normal peripheral field of vision. So long as nose point 32 of image A is held at the center of attitude circle D and images B and C appear as aligned lateral extensions of the wings of airplane image A, the pilot is assured that optimum takeoff attitude, airspeed and rate-of-climb are being maintained. The pilot then moves his controls in the customary fashion to maintain the image lines B and C as aligned lateral extensions of the wings of the airplane image A until an altitude of say 500 to 1,000 feet is reached knowing definitely that he is flying a precision takeoff. Since this display is in the normal line of vision of the pilot appearing at infinity as hereinbefore pointed out, the pilot's normal visual observance through the windshield is in no way diverted as is the case where he is required to read the actual flight instruments on the aircraft's instrument panel. This display insures a safe takeoff in clear visibility and, in the case of poor visibility due to rain, fog or low hanging clouds, provides the pilot with a continuous visual indication to determine that the aircraft is maintaining a proper takeoff attitude, airspeed and rate-of-climb. (And, if desired, a proper heading—see description of the use of the direction line image G further on in this description).

CLIMB. Upon reaching a 500- to 1,000-foot altitude the flight mode selector switch is switched to the "Climb" position. This sets the attitude circle D relative to horizon line H for the optimum correct climb attitude and also sets the airspeed line and vertical speed line display images for the correct climbing airspeed and rate-of-climb for the particular aircraft. The pilot then adjusts the nose of the aircraft to center nose point 32 of image A in attitude circle D and maintains the airspeed and vertical speed images C and B as aligned lateral extensions of the airplane image A at their appropriate preset climbing airspeed and rate-of-climb. The pilot flys this setup until he reaches the desired cruising altitude.

Should it be desired to execute a turn during climb to get the aircraft on course, the pilot moves his controls in the usual manner to bank the aircraft maintaining his airspeed and rate of climb. By maintaining the nose point 32 of image A at the center of attitude circle D and the airspeed and vertical speed images C and B as aligned lateral extensions the banking turn is properly executed. The display assumes the appearance shown in FIG. 3 of the drawings until the turn is completed to the course bearing desired as indicated by the direction line image or by the aircraft's compass. Of course, in a steep turn, the pilot will hold the aircraft's nose a little higher, and the nose point 32 of small airplane image A a little above the center of attitude circle D in order to maintain the same rate-of-climb, in the customary manner for flying steep turns. During a steep turn there may be some decrease in airspeed and this will be signaled to the pilot when the airspeed line moves a little above the lateral extension of the right wing end of the small airplane image A simulating the counterclockwise movement toward zero which the pilot is accustomed to observe when viewing the conventional airspeed indicator when airspeed is decreasing.

CRUISE. Upon attaining the cruising altitude, the flight mode selector switch is switched to "Cruise" position. This sets the attitude circle D relating to horizon line H to the optimum cruise position for the optimum aircraft nose attitude, and applies the correct bias resistance in the airspeed and vertical speed reticle servomotor circuits to cause the airspeed line C to be laterally aligned with the right wing end of small airplane image A when cruising airspeed is attained and to cause the vertical speed line B to be laterally aligned with the left wing end of a small airplane image A when zero rate-of-climb or descent prevails. The pilot flying by visual flight reference in clear weather then maneuvers the aircraft in the usual manner by visual reference to the ground, the horizon and the compass to maintain normal flight and uses the display as a reference check and an aid to precision flying by bringing the nose point 32 of image A to the center of attitude circle D and by bringing the airspeed line and vertical speed line images C and B into position at the cruise setting as aligned lateral extensions of the wings of small airplane image A to assure optimum and precision cruising flight. In clouds or under nonvisual flying conditions due to unexpected weather conditions which may close in rapidly with decreasing visibility causing ground and horizon references to be lost to view, a pilot without the visual display of this invention must make a transition to instrument flying by referring to his instrument panel gauges, may have to change his flight plan with incident radio communication to ground control and frequently encounters increasing turbulence. In this situation even an experienced instrument pilot requires a certain period of time to make this transition to instrument flight and an inexperienced pilot, upon loss of visual flight references, may become confused or even panic in attempting the transition. Either the delay, confusion, or panic can result in a wide change in the attitude and speed of the aircraft with consequent discomfort of the passengers and crew, and deviations from safe flight altitude and navigational positions which the pilot is either assigned by FAA Air Traffic controllers or which he must maintain to keep FAA Air Traffic controllers informed at all times of his flight altitude position and route and, may and frequently does cause vertigo, disorientation, and actual loss of flight control of the aircraft. The need of the pilot to resort to scanning of his instruments to restore the aircraft to optimum flight conditions by the control maneuvers necessary to correct nose deviations, wingdown positions, etc. is a time consuming and fatiguing process. An inexperienced pilot will tend to transition back to visual reference flying and then be forced to perform many transitions back to his instruments as the aircraft flys in and out of poor visibility conditions. The present visual display enables the pilot to immediately fly the display without any need to deviate his visual observation from the outside to the inside instruments on the instrument panel, since the visual display remains before him on the screen with the horizon line image H out in front where he is used to seeing the real horizon. Should the nose attitude deviate from the prescribed cruise nose attitude, nose point 32 will deviate from the center of attitude circle D and image C and image B will swing conjointly to a correlated downward or upward sloping position immediately signalling the pilot to make the appropriate corrective control movements to restore attitude, airspeed and vertical speed to optimum as indicated by lateral alignment of image C and B with the wing of airplane image A, and the position of nose point 32 in the center of attitude circle D. While this is taking place without undue pilot strain, the attitude of the aircraft with respect to the horizon is graphically apparent to the pilot by the relative positioning of the wings of the airplane image A to the horizon line image H. Any out-of-level condition of the aircraft is immediately signalled to the pilot enabling him to take early corrective control action to a position parallel to the horizon. It will be appreciated, therefore, that the present display system enables the pilot to transition from normal visual reference flying using the ground and actual horizon references to "instrument flying" by reference to the dynamically arranged images of the present display in zero time and with minimal corrective maneuvering. Loss of control of the aircraft during cruising or in any mode of flight, as a result of rapidly changing weather conditions is, accordingly, practically impossible, even with inexperienced pilots by use of this invention. In the case of turns during level cruise the pilot banks the aircraft conventionally with the conventional movements of his controls to maintain the airspeed and vertical speed images C an B in the optimum positions laterally aligned to the respective wings of the airplane image A. If the pilot in turning permits his nose to get a little too low or too high, the deviation will be immediately signalled by a departure of the vertical speed line image B from zero rate-of-climb and a corresponding increase or decrease movement in the same direction of the airspeed image C so that compensating movement of the aircraft controls can be promptly taken to raise or lower the aircraft's nose and to decrease or increase the rate-of-climb and airspeed to restore the display, and the aircraft, to optimum level flight condition. In executing a steep turn, the pilot may find it necessary to hold the nose point 32 of image A slightly above the center of the attitude circle D to maintain level flight, in the conventional fashion of executing steep turns. It should be noted that during all visual flying reference operations the pilot is constantly fully aware of the instrument presentation due to the projected display out in front of him and, more importantly, he has had a constant and direct exemplification of the relationship between instrument presentation and his visual references so that an instantaneous transition can be made to assure full flight control in passing through changing weather conditions affecting visual observation of the ground and real horizon. Even when flying a relaxed flight on a clear day by visual ground reference, perhaps not consciously aware of the instrument display, he will have had constant "instrument flight training" on a subliminal level.

To aid the pilot in steering a compass course after establishing straight and level cruise, in clear visual flight conditions, or in instrument flight conditions when he heretofore would have had to resort to conventional instrument flying, the present invention provides a vertically oriented direction line reticle which is slaved as heretofore pointed out to a compass and compass bug settable to the desired heading by the pilot. Use of the direction line image reticle E is effected by turning direction line switch 33 (FIGS. 2 and 13) from its vertical off position to the left to "Compass." When this is done, the broad vertical direction line E appears on screen 20 indicating the desired heading as fixed by the compass bug. The pilot then steers the aircraft and small airplane image A toward the direction line E to bring it to the center of the display to coincide with the nose point 32 of airplane image A, i.e., he banks the small airplane image A and flys it toward the direction line image E. In steering the aircraft onto course in this manner in instrument flight conditions, it is preferable that an inexperienced pilot not bank over 5° to ease over to the direction line to avoid the risk of loosing control in a steep bank.

Alternatively, direction line switch 33 may be turned to the right to "VOR/LOC." This connects the vertically oriented direction line reticle as a slave to the Omnisignal or Localizer signal of the Omnireceiver of UHF Localizer receiver where the aircraft is so equipped. The steering procedure is the same as heretofore described where the direction line reticle is connected to the compass bug.

Figure 2:
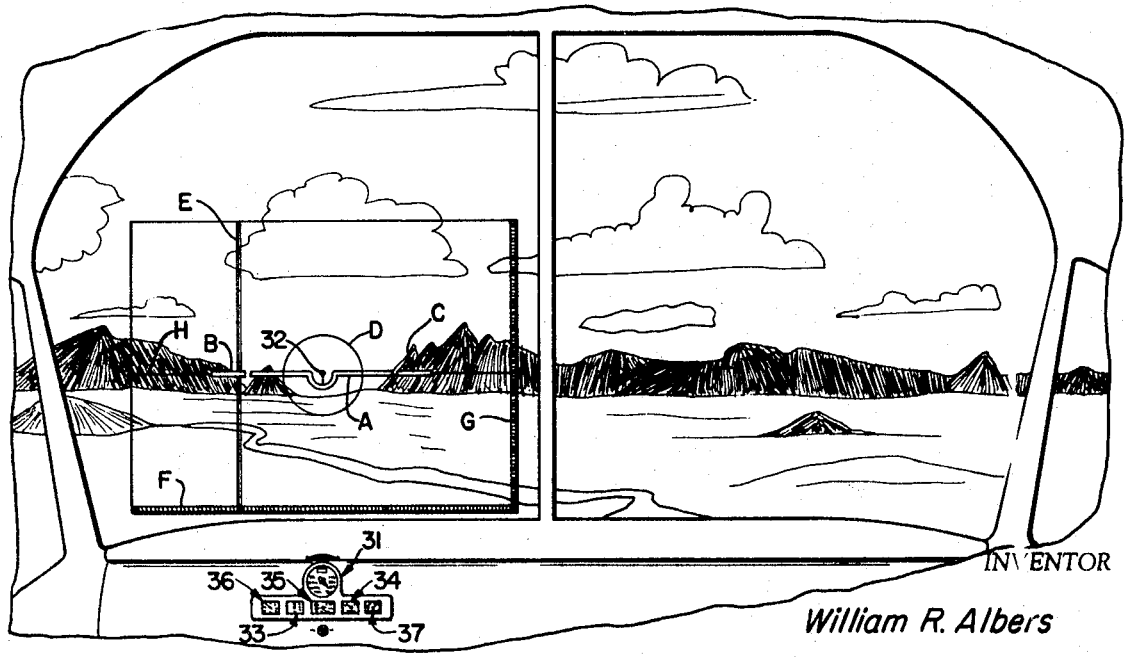
FIG. 2 is a schematic transverse sectional view of the cockpit of FIG. 1 depicting the pilot's view through the reflector screen and windshield of an aircraft equipped with the flight control system of the present invention depicting the system controls below the windshield panel and showing on the screen the images seen by the pilot when the flight mode selector is set to cruise.
Figure 2:
Figure 3:
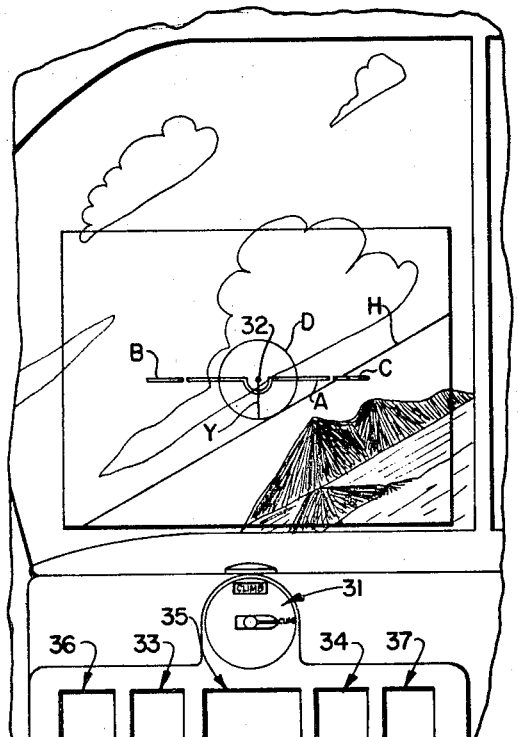
FIG. 3 is a transverse sectional view similar to FIG. 2 showing on the screen the images seen by the pilot when the flight mode selector is set for a climb and a climbing right turn is being made.
Figure 4:
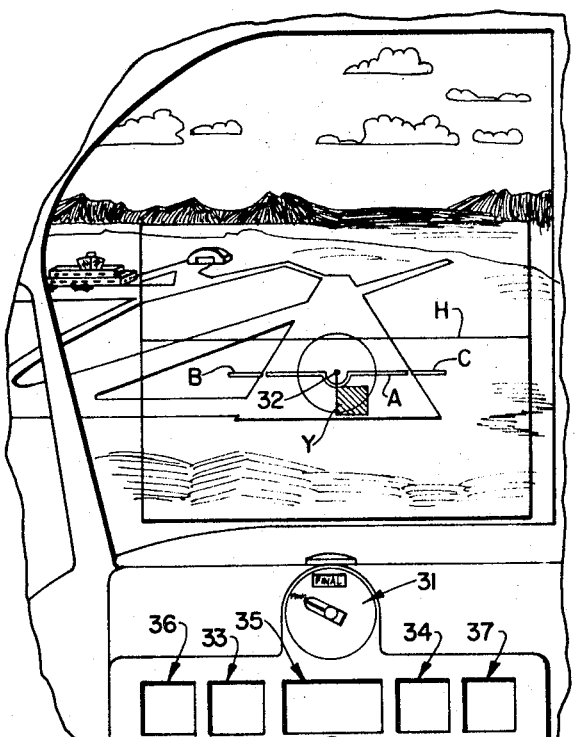
FIG. 4 is a quarter transverse section similar to FIG. 3 showing on the screen the images seen by the pilot when the flight mode selector is set for a final approach to a runway with the aircraft's flight attitude, airspeed, and rate-of-descent correctly maintained by the pilot and with the aircraft on an optimum glide slope to the touchdown point on the runway.
Figure 5:
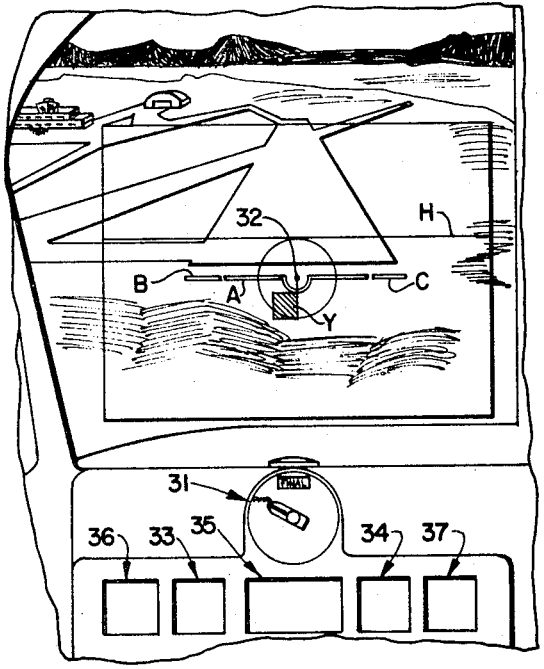
FIG. 5 is a quarter transverse section similar to FIG. 3 showing on the screen the images seen by the pilot when the flight mode selector is set for a final approach to a runway with the aircraft's flight attitude, airspeed and rate-of-descent correctly maintained by the pilot but with the aircraft being too low, i.e. below the optimum glide slope, which would result in landing short of the runway.

The Yaw display can be used during any phase of flight. When the Yaw display switch 34 (FIGS. 2 and 13) is in the off position the Yaw display is completely removed from the system. When the Yaw display switch is switched to the on position this connects the Yaw display reticle through Autosyn synchros to the Yaw rate gyro unit of the aircraft and so long as the aircraft is in balanced flight, i.e., is flying without skidding or slipping there is no indication at all on screen 20. If the aircraft is flying in an unbalanced, slipping or skidding fashion, the Yaw display will appear at one or the other sides of screen 20 in the form of a vertical distinctively colored transparent band G (FIG. 2). For example if the aircraft is skidding to the left the colored band G will move in over the left edge of screen 20 covering more of the screen as the skidding condition worsens. The pilot will be immediately aware of the skid without shifting his eyes from his normal visual reference flying through the windshield and screen 20. To correct the situation the pilot adds left rudder in the usual manner and as the skid is corrected the colored band G moves to the left and finally moves off the screen altogether when a balanced flight condition has been restored. In the case of skidding to the right the colored band will move in from the right and the condition will be immediately signalled to the pilot who corrects the condition by adding right rudder until balanced flight conditions are restored. The corrective rudder actions are the same as the pilot has learned to use in correcting a skid or slip when flying by visual reference or by conventional instrument reference. The pilot, however, is warned by the display much sooner than he would become aware of such unbalanced flight conditions by conventional visual reference or by conventional flight instrument reference and he is able to take corrective action much sooner thus minimizing the undesired effects of unbalanced flight. Alternatively the Yaw display can be arranged to provide Yaw indications on the small airplane image A rather than indications in the form of vertical colored bands which move in from the sides of screen 20. In the alternative arrangement, when the Yaw display is turned on by switch 34, a short vertical line image Y appears on small airplane image A, extending downward from the center of the small airplane as shown in FIG. 3. A Yaw condition will then be indicated by the appearance of a broad horizontal colored transparent band extending laterally to the left when the aircraft is skidding to the left and laterally to the right when the aircraft is skidding to the right as shown in FIG. 4 and FIG. 5. The lateral length of the band indications will increase as the skidding condition worsens.

The Altitude display is normally switched to one of its "On" positions through operation of switch 35. For indication of variation from preselected limits above or below an assigned cruising altitude, switch 35 is turned to its "Cruise" position and one of the limits pushbuttons PB–1, PB–2, or PB–3 is depressed to condition the Altitude display reticle 24 for operation through an Autosyn synchrocircuit, to be hereinafter described in detail, slaved to the hundreds-of-feet altimeter pointer shaft. Assuming the 50-foot limit pushbutton PB–2 is depressed to couple the Autosyn synchrocircuit to the hundreds-of-feet altimeter pointer shaft at a cruising altitude of 10,000 feet the Altitude limits display will be maintained off of screen 20 so long as the aircraft maintains a cruising altitude between 9,950 feet and 10,050 feet. Should the aircraft descend more than 50 feet below the established 10,000-foot cruising altitude the Altitude Limits display will start to appear at the bottom of screen 20 in the form of a horizontal distinctively red colored band F (FIG. 2). As the downward deviation increases band F will move up further and cover a greater section of screen 20 and the pilot will become immediately aware of the deviation without shifting his eyes from his normal visual reference flying through the windshield and screen 20. To correct the deviation, the pilot simply raises the nose of the aircraft causing the nose point 32 of image A to move upward in the Attitude Circle D until the band F moves downwardly off screen 20. The pilot then levels out the aircraft by lowering its nose until nose point 32 of image A is centered in the Attitude Circle D. He can then cross-check to the conventional altimeter to confirm that he has returned to the prescribed cruising altitude. If the aircraft climbs more than 50 feet the Altitude Limits display will appear in the form of a horizontal distinctively blue colored transparent band F (FIG. 2) at the top of screen 20 warning the pilot to take corrective action. Such corrective action involves lowering the nose of the aircraft causing the nose point 32 of image A to move downwardly in the Attitude Circle D until the band F moves upwardly off screen 20. The pilot then levels out the aircraft by raising its nose until nose point 32 of image A is centered in the Attitude Circle D. He can then cross-check the conventional altimeter as heretofore described. Again the pilot is forewarned by the display of this invention to take conventional but very early, corrective action to maintain proper flight altitude.

The Altitude Display may also be used as an indicator when climbing to a planned altitude or to an altitude assigned by air traffic control and when making altitude penetrations (descents) into holding patterns or into terminal airports when it is necessary to be extremely accurate and cautious so as not to pass through the planned altitude or the altitude last cleared to by air traffic control. For this use of the altitude display a digital selector of conventional construction provided with three indicator dials displayed through a three-place window and controlled by knob 35a is provided. The number in the window on the left side represents tens of thousands-of-feet altitude, the number in the middle window represents thousands-of-feet altitude, and the number in the window on the right represents hundreds-of-feet altitude.

When set to zero in each window the assigned altitude circuit is disconnected from the altitude limits display circuitry. When numbers are cranked into each window associated multiple throw switchs connect bias resistances of appropriate value into the "Low" or "High" Autosyn synchrocircuit of the Altitude Display so that the receiver synchroservomotor will not be energized until signalled by the hundreds, thousands, or tens of thousands synchrotransmitter motors as the respective pointers reach and indicate the altitude selected by the altitude digital selector.

Thus, for example, when an aircraft is cleared by air traffic control to descend from a flight altitude of 35,000 feet to 20,000 feet, the pilot sets the altitude digital selector to 20,000 feet (or to 20,500 feet if he wishes to be forewarned). Then, when the aircraft reaches the altitude set in the digital selector window, the colored transparent horizontal band moves up from the bottom of the display immediately signalling the pilot that he has reached the prescribed altitude. No matter how busy the pilot may be with other flight chores such as navigation and radio communications, he cannot fail to be dramatically signalled by the display preventing descent through planned or assigned altitudes or descents beyond planned or assigned altitudes resulting from misreading of standard altimeter instruments. Both of these occurrences have been implicated and suspected in many serious aircraft accidents.

For indication of arrival at a preselected altitude, switch 35 is turned to its "Climb To" or "Descent To" or "ILS MIN" position as called for by the flight plan being followed. Such positioning of switch 35 electrically disconnects the Autosyn synchrocircuit established by positioning switch 35 in its "Cruise" position, disconnects pushbutton switches PB–1, PB–2 and PB–3 and their biasing circuits, and slaves either the high altitude image band F through an Autosyn synchrocircuit or the low altitude image band F through a second Autosyn synchrocircuit, dependent upon the setting of switch 35, to all three of the altimeter pointer shafts through the digital selector controlled by switch knob 35a. Assuming switch 35 is set and the digital selector is set to the desired altitude to be attained, an appropriate biased voltage will be applied to one side of the stator winding of the selected altitude synchroreceiver and the three altimeter pointer shaft operated synchrotransmitters will apply an opposing bias voltage plus an angular voltage to the other side of the stator winding of the selected altitude receiver synchro of an appropriate combined voltage to maintain the selected altitude image band F off of screen 20 until the preselected altitude set in the windows of the digital selector is reached. When the set altitude is reached, the selected altitude band F will become visible at the bottom of screen 20, if switch 35 is set to "Descent To" or "ILS MIN," or at the top of screen 20, if switch 35 is set to "Climb To," and the pilot will be immediately warned that the selected altitude has been reached and will take the necessary action to either bring the nose point 32 of image A to a centered position in Altitude Circle D to maintain flight at the preselected altitude or to carry out any other flight pattern required by the flight plan using switch 31 for this purpose as herein pointed out.

The system of the present invention provides compensating means for use with the system when applied to high performance or large jet aircraft where the optimum airspeeds and vertical speeds will vary significantly with variations in temperature, pressure altitude variations, weight and balance, etc. This means takes the form of an airspeed line adjustment switch 37.

The compensating adjustment switch 37 has a pointer 41 movable over a dial 42 calibrated in knots or miles per hour over a range of airspeeds appropriate for the particular type of aircraft flown allowing the pilot to adjust the preset airspeed provided by switch 31 and select the corrected airspeeds for the various phases of flight as predetermined by his preflight planning and calculations. Switch 37 is a multiple throw switch which introduces various appropriate bias resistances into the bias circuit of the airspeed reticle servo synchromotor circuit causing the airspeed line image C to be laterally aligned with the right wing end of small airplane image C when the aircraft is flying at the selected compensated airspeed indicated by the pointer 41 of the airspeed line adjustment switch 37.

The system of the present invention also provides the pilot with a means for manually selecting a particular rate-of-climb or rate-of-descent if he desires to assume a rate-of-climb or descent different from the optimum rate provided for the various phases of flight by the settings of the flight mode selector switch 31. This means is provided by the vertical speed line switch 38 which has a pointer 39 movable over a dial 40 calibrated in feet per minute up and down over a range appropriate for the particular type of aircraft flown. This switch 38 is a multiple throw switch which introduces various appropriate bias resistances into the bias circuit of the vertical speed reticle servo synchromotor circuit causing the vertical speed line image B to be laterally aligned with the left wing end of small airplane image A when the aircraft's rate-of-climb or descent equals the selected rate of climb or descent indicated by the pointer 39 of the vertical speed line switch 38.

PATTERN. The flight mode selector switch 31 also provides pattern flying positions between its climb and cruise position and between its descent and final approach positions. When flight mode selector switch 31 is set in either of these pattern positions, it sets the attitude circle D to its optimum position and establishes the prescribed airspeed, and vertical speed (zero for pattern flying). The display on screen 20 provides the pilot with instantaneous flight information of the character heretofore described enabling the pilot to make prompt adjustments to maintain the appropriate pattern altitude and airspeed specified by the FAA air traffic control or FAA regulations. In flying the pattern setting, the pilot can use the altitude display to assist in maintaining pattern altitude.

DESCENT. When the cruising flight is completed and the pilot begins his descent preliminary to a landing approach, the flight mode selector switch is moved from cruise to descent. This positions attitude circle D at the optimum nose attitude position for descent, and causes the airspeed image line C and the vertical speed image line B to be laterally aligned with the ends of small airplane image A when the optimum correct descent airspeed and rate-of-descent are established for the particular type of aircraft in which the system is installed by introducing the appropriate bias resistance into the airspeed and vertical speed reticle servo synchromotor circuits. The display will appear about as shown in FIG. 4. The pilot then simply lowers the aircraft's nose down until the nose point 32 of image A is centered in the attitude circle D, adjusts the throttle to maintain the airspeed display C laterally aligned with the right wing of the display image A, and the vertical speed display B laterally aligned with the left wing of the display image A. In the case of high performance or large jet aircraft airspeeds which are corrected for air temperature, pressure altitude etc. can be flown by use of the airspeed adjustment line switch 37 as described previously. This display is flown until the final approach to landing is started.

FINAL APPROACH TO LANDING. When the pilot is ready to start his Final approach leg he actuates the flight mode selector switch to either its Final position or its ILS position depending upon whether a visual reference landing approach or an instrument landing approach is to be made.

Figure 6:
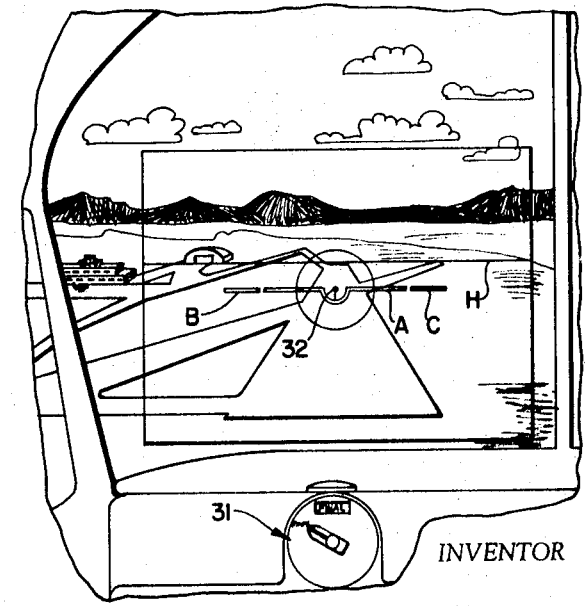
FIG. 6 is a quarter transverse section similar to FIG. 3 showing on the screen the images seen by the pilot when the flight mode selector is set for a final approach to a runway with the aircraft's flight attitude, airspeed, and rate-of-descent correctly maintained by the pilot, but with the aircraft being too high, i.e., above the optimum glide slope, which would result in the aircraft landing long or too far down on the runway.

When the system of the present invention is used for a visual landing approach it provides the pilot with a means of flying a predetermined glide slope to the touchdown point. This is evident when you consider that the present system provides the pilot with the means for flying a predetermined aircraft pitch angle, airspeed and rate-of-descent and a means for sighting on the touchdown point and correcting for headwind and crosswind. When flight mode selector switch 31 is set to final, the attitude circle display D is set to the optimum nose down attitude with respect to horizon line image H for the landing approach glide of the particular aircraft flown. In most light planes the attitude circle D will be set below and centered at a predetermined point with respect to the horizon line H as shown in FIGS. 4 through 6. In most high performance and large jet aircraft the attitude circle D will be set centered at a predetermined point above horizon line H. The airspeed line image C setting will indicate the optimum approach airspeed for the particular aircraft when laterally aligned with the right wing end of small airplane image A, and the vertical speed line image B will indicate optimum rate-of-descent when laterally aligned with the left wing end of small airplane image A. The pilot adjusts to the established glide slope at a point which he judges to be the optimum distance from the landing strip by maneuvering the controls to place nose point 32 of image A in the center of the preset attitude circle D and setting the throttle to optimum approach power. When this is done, the airspeed and rate-of-descent will settle down to the proper values and the airspeed line image C and vertical speed line image B will become laterally aligned with respect to the wings of small airplane image A. The pilot then uses the attitude circle D as a sight centering it with respect to the landing strip to determine where his gliding descent will touch down.

If too high (too close in) or too low (too far out) the attitude circle D and small airplane image A will appear respectively too far down the runway (See FIG. 6) or short of the runway or desired touchdown point (See FIG. 5). To correct these situations and get on the optimum glide slope, the pilot respectively lowers the nose of the aircraft until nose point 32 of image A reaches the bottom of attitude circle D thus increasing the rate-of-descent or raises the nose of the aircraft until nose point 32 of image A reaches the top of attitude circle D thus decreasing the rate-of-descent. He maintains the prescribed airspeed at this time by easing the throttle back in the first case or advancing the throttle in the second case to keep the airspeed line image C aligned with the right wing of airplane image A. As the aircraft intercepts the optimum glide slope, the center of attitude circle D will approach the desired touchdown point. As this happens, the pilot eases the nose of the aircraft up or down as required to bring nose point 32 of image A to the center of attitude circle D and adjusts the throttle to maintain approach airspeed and power as indicated by lateral alignment of airspeed line image C with the right wing of airplane image A. The aircraft is now on the optimum glide slope flying at the optimum glide angle with optimum approach power, correct airspeed, and correct rate-of-descent. By simply keeping the airplane image nose point 32 within and near the center of the attitude circle D and keeping the airspeed line image C and vertical speed line image B laterally aligned with the wings of airplane image A he will fly a precision approach to a landing. In correcting for an initial too high or too low approach corrections will be executed gradually and the correct glide angle will be reached automatically as the glide slope is intercepted. The procedure at all times will involve conventional easy and natural visual flying procedures. If some unusual down or up draft condition occurs, and the pilot sees he has departed from the optimum glide slope, he corrects again as described above. In real turbulent air and gusty wind, the pilot does not try or need to continually correct for every deviation but does as he has always done, rides out or averages out many up and down deviations making only a few gradual corrections for persistent deviations from the optimum glide slope or persistent deviations in airspeed or rate-of-descent established by the display of this invention. If the pilot keeps the nose point 32 of small airplane image A near the center of attitude circle D and does only a fair job of keeping the airspeed and vertical image lines aligned with the airplane image A, he will be flying down an optimum glide slope with good control of attitude, airspeed, power, rate-of-descent and glide angle and will execute a precision approach with ease and without the intense effort and attendant strain associated with the conventional method of cross-checking instruments in the instrument panel. When flare-out altitude is reached the pilot will find that he is at optimum airspeed and rate-of-descent and in substantially perfect position with respect to his touchdown point.

Due to the use of the system of the present invention, the pilot will be flying the same optimum glide slope no matter where or when he is shooting a landing. This "builtin" glide slope will prevent undershooting or overshooting which frequently occurs at strange fields, especially at night or in poor visibility, and will also eliminate optical illusions on visual flying reference approaches which plague even experienced flyers at times.

If it should be necessary to abandon an instrument approach or a visual reference approach and initiate a go-around the system of the present invention permits the pilot to execute the go-around maneuver with safety and ease since he does not have to go through the process of transition from visual reference to instrument reading and interpretation, and since he is constantly aware of his aircraft flight attitude, airspeed, and vertical speed. He is aware of his rate-of-descent or climb, and more importantly the present system gives the pilot a definite indication when a positive rate-of-climb has been achieved because the vertical speed line image B will rotate upward and point above the reference line provided by the wings of the small airplane image A.

Cockpit procedures will of course have to require that the pilot or copilot set flight mode selector 31 to the takeoff position as a first order of business on the go-around or missed approach checklist when it is decided to initiate a go-around. As a convenience a special switch on the pilot's control yoke could be installed to automatically set flight mode selector switch 31, and the display, to the takeoff mode when actuated by the pilot.

Headwinds on final approach will also be signalled by the display of this invention since the pilot will note that the desired touchdown point is slipping away from the nose point 32 of the airplane image and the center of attitude circle D. The pilot immediately corrects for this deviation by raising the nose of the aircraft to bring nose point 32 of image A a little above the center of attitude circle D and adding a little power to keep the airspeed image line C level with the right wing of the airplane image A. Again the pilot is called upon to follow only the familiar standard method of adjusting for headwind taught and practiced for conventional visual flying reference and instrument flying reference approaches.

Crosswinds on final approach will be signalled by the display of this invention since the nose point 32 of the airplane image A and the attitude circle D will move right or left from the centerline of the runway. The pilot immediately adjusts for such deviations by the usual methods taught and practiced for conventional visual flying reference and instrument flying reference approaches, i.e., assuming a crab-angle or lowering a wing and adding some top rudder, or a combination of these two methods. The wing low approach is recommended since it will keep both the system display and the aircraft aligned with the centerline of the runway.

If conditions necessitate an ILS landing approach, the runway or runway lights being obscured by low clouds, heavy fog, rain, etc., the flight mode selector switch 31 is turned to its ILS position. This switching removes the attitude circle reticle from the system and replaces it by an ILS circle reticle plate 44 (See FIG. 8) characterized by the vertical and horizontal intersecting lines 45 and 46 of distinctive color and of less intensity of illumination than the other display images which cross at the center of the ILS circle. Reticle plate 44 is slaved through synchroservomotors to reproduce the movements of the indicators of the standard cross-pointer instrument one synchro 47 being connected to the output of the aircraft's standard glide slope receiver to impart up and down movement to reticle plate 44 and incident up and down movement to the image of the ILS circle projected onto screen 20, and the other synchro 48 being connected to the radio output of the aircraft's standard localizer receiver to impart lateral movement to the image of the ILS circle projected onto screen 20. This position of the flight mode switch sets up the display for indicating the optimum nose or flight angle, airspeed and rate-of-descent for the landing approach as heretofore explained, and also connects the low altitude portion of the altitude display into the system to provide an indication of the "minimum altitude" prescribed for the particular runway being approached, the pilot simply cranks the prescribed ILS minimum altitude into the digital selector window. In operation the ILS reticle plate 44 will move in accord with the movements of the standard ILS cross-pointers and the image of the ILS circle will appear on screen 20 in place of the attitude circle image D but will be centered at a point corresponding to that of the intersection of the glide slope pointer and the localizer pointer of the standard cross-pointer indicator instrument. The pilot then flys airplane image A to the center of the ILS circle image controlling airspeed and rate-of-descent to maintain these speeds within safe variations. Since the ILS circle image will be centered in the display with the small airplane image A at the center of the ILS circle when the aircraft is on the instrument course and glide slope, flying the airplane image A to the center of the ILS circle will visually show the pilot he is on the optimum glide course and glide slope. If the aircraft is below the established instrument glide slope and to the left of course, the ILS circle image will appear in the right upper corner of screen 20. The pilot will correct in this case by raising the nose and banking to the right to bring the ILS image circle center and nose point 32 of image A together. Comparable corrective measures will be taken if the ILS circle image appears at any other area of screen 20 to bring the ILS circle and nose point 32 of image A into coincident centered positions. So long as this appropriate optimum relation is maintained with reasonable accuracy, the pilot can visually fly his approach on the screen display knowing he is flying a proper instrument landing approach without the need of referring to his instruments, and he is also able to instantly see and identify the runway upon breaking out of the overcast or upon coming within visual range of the runway and he is able to reestablish conventional visual flying reference without transitional effort and loss of time should visual flying reference conditions be lost either momentarily or permanently. As a consequence, the pilot is at all times ready instantly to take advantage of conventional visual flying reference conditions during his instrument approach and is ready to abandon an instrument approach in favor of a visual approach if changing ambient conditions warrant. The pilot will always have visual confirmation that his approach is being executed with optimum or near optimum attitude, airspeed, rate-of-descent, power, and glide angle and relieved of much of the fatigue and tension occasioned by conventional instrument flying reference as well as the mental calculations necessitated in the constant scanning of the several separate informational instruments requiring attention in conventional instrument flying reference.

Assuming the "minimum altitude" of the particular runway being approached is 400 feet and that the pilot upon turning switch 31 to its ILS position has set 400 feet in the digital selector window and has flown his instrument approach to the "minimum altitude" and finds he has still not established visual contact with the runway, the low altitude band F will appear along the bottom of the display. This immediately warns the pilot that the prescribed "minimum altitude" for the runway has been reached and that his approach should be abandoned and that he should initiate a "go-around" or "missed approach" procedure and try again.

DESCRIPTION OF THE SYSTEM COMPONENTS

Referring again to FIG. 1, collimating projector 21 includes a housing portion 49 closed at one end by the final lens of the lens system 22 which is of conventional construction mounting the necessary lenses for producing collimated displays and open at its opposite end for operative connection to a housing assembly indicated by reference numeral 50 mounting the several transparent reticle plates 23 through 28, the high intensity light bulb 29, and the synchroreceivers and mechanical drives (not shown in FIG. 1) required to impart the necessary movement to certain of the reticle plates. The cable connected to the bottom wall of housing assembly 50 carries the necessary wiring to light bulb 29 and the various synchroreceivers. The term synchro, as is well known, is the name applied to miniature, lightweight, precision electromagnetic devices primarily used for transmissions, reception, or conversion of angular data, in signal or positioning indicating systems, and in aircraft instrument installations as components of synchrocontrol circuits. These synchros per se form no part of the present invention but are commercially available units produced by numerous companies, such as Eclipse-Pioneer Division of Bendix Aviation Corporation which markets them under the trademark Autosyn. Bendix's Autosyn synchrotransmitters and Autosyn synchroreceivers are admirably suited for the purposes of this invention and have been referred to throughout this description for convenient reference.

The several reticle plates will be mounted in suitable spaced relation in housing assembly 50 together with their respective collimating lenses and synchroreceivers. Since certain of the reticle plates, namely, the small airplane image reticle plate 28 and the attitude circle reticle plate 26, are required to be fixedly or partially fixedly related to the aircraft's fuselage to establish fixed images on screen 20 having a prescribed correlation to the longitudinal axis of the aircraft and the nose of the aircraft, it is contemplated that housing 49 and housing assembly 50 will be fixedly connected and fixedly mounted behind the instrument panel immediately in front of the pilot's seat and in vertically centered relation below screen 20. For the purpose of this description, reticle plate 28 will be designated the small airplane reticle even though it also mounts the vertical speed and airspeed reticles, reticle plate 27 the horizon line reticle, reticle plate 26 the attitude circle reticle although it also mounts the ILS reticle, reticle plate 25 the direction line reticle, reticle plate 24 the altitude display reticle, and reticle plate 23 the yaw display reticle. The details of each of the reticle plates and their purpose and operation will now be described.

THE SMALL AIRPLANE RETICLE. Small airplane reticle 28 (FIG. 9) comprises a generally rectangular plate 51, preferably of transparent plastic that is rigid and of high light transmitting qualities, having a centered circular opening 52 fixedly mounting a transparent disc 53 etched along its lateral diameter to form oppositely directed light interruption lines 54 and 55 connected at their inner ends by a dependent arc 56 having a radial upstanding line normal to lines 54 and 55 terminating at the center of the disc in a small circle forming nose point 32 heretofore described. Disc 53 is assembled carefully to dispose lines 54 and 55 coincident with the lateral centerline of plate 51 so the etched lines and circle 32 will form airplane image A on screen 20 in exact correlated relation to the wings and nose of the aircraft when plate 51 is fixedly mounted in housing assembly 50 with lines 54 and 55 coincident with the lateral centerline of housing assembly 50.

Plate 51 is also provided in lateral diametrical relation to opening 52 with a pair of semicircular openings 57 and 58 generated around the axes of respective shaft pivot openings 59 located at the point of intersection of respective planes, one normal to the opposite faces of plate 51 and containing the lateral diameter of disc 53 and openings 57 and 58 and the other respective plane normal to the opposite faces of plate 51 and containing the respective axes of pivot openings 59. Pivot openings 59 journal the upper ends of respective vertically dependent shafts 61 and 62 fixedly mounting respective transparent plastic, rectangular rodlike vanes 63 and 64 etched longitudinally to form light interruption lines 65 respectively forming vertical speed line image B and airspeed line image C. As clearly seen in FIG. 9, vanes 63 and 64 are disposed to swing or pivot around the axes of shafts 61 and 62 causing airspeed and vertical speed images C and B on screen 20 to pivot around the outer ends of the wings of airplane image A.

The lower ends of shafts 61 and 62 are respectively fitted with drive gears meshingly engaging rotor shaft gears 67 of respective synchroreceivers 68 and 69 of any well-known construction grounded at 70 and suitably fixedly mounted in housing assembly 50 to drive shafts 61 and 62 in accord with electrical angular information transmitted by respective synchrotransmitters 71 and 72 drivingly connected through rotor shafts 73 in conventional manner respectively to the vertical speed pointer shaft and the airspeed pointer shaft of the aircraft's vertical speed indicator 74 and airspeed indicator 75. The electrical circuit interconnecting transmitter synchro 71 and receiver synchro 68 is connected through lead 76, and switch arm 77 of flight mode selector switch 31 in its several flight mode selection positions to a predetermined power supply contact arranged to conventionally impose a biasing voltage of predetermined value on the circuit sufficient to assure that vane 63 is positioned with its etched line 65 as a lateral spaced extension of line 54 of disc 53 when the optimum airspeed for the selected flight mode is indicated by the aircraft's airspeed indicator 75. Similarly the electrical circuit interconnecting transmitter synchro 72 and receiver synchro 69 is connected through lead 78 and switch arm 79 of flight mode selector switch 31 to a predetermined power supply contact arranged to conventionally impose a biasing voltage of predetermined value on the circuit sufficient to assure that vane 64 is positioned with its etched line 65 as a lateral spaced extension of line 55 of disc 53 when the optimum vertical speed for the selected flight mode is indicated by the aircraft's vertical speed indicator 74. In this way, the airplane image A will at all times depict the instantaneous flight attitude of the aircraft while the vertical speed image B and the airspeed image C will appear as aligned lateral extensions of the wing ends of image A so long as the optimum rate of climb or descent and airspeed is maintained by the pilot. Deviations from these preestablished optimums will be visually displayed before the pilot's eyes as heretofore printed out.

THE MODE SELECTOR SWITCH AND ITS CONTROLLED RETICLES

FIG. 15 shows a mode selector switch of suitable construction to establish the appropriate electrical voltages for the several synchrocircuits at the preselected flight mode upon operation of the flight mode selector switch 31. As there shown, the mode selector switch pointer 80 is fixed to shaft S of suitable electrical insulating material in correlated angular relation to airspeed switch arm 77, vertical speed switch arm 79, and ILS switch arm 81, and the attitude circle switch arm 82 all of which are fixed in relative axially spaced relation to shaft S. Switch arms 77, 79, 81 and 82 are respectively electrically insulated from each other by shaft S and vertically spaced below pointer 80 to sweep over respective circular insulated contact plates 83, 84, 85 and 86 having power supply contacts respectively designated 83a to 83g, 84a to 84g, 85a and arcuate contact plate 85b and 86a to 86g. These respective contacts comprise the power supply contacts of respective power circuits energized by a common power source 87 of constant voltage and designed to impose respective predetermined voltages of varying magnitude on the respective synchrocircuits in accord with the angular position of pointer 80 and the several switch arms 77, 79, 81 and 82. It will be noted that the contact plate for the ILS switch arm 81 has a single contact 85a at the 11 o'clock or ILS position and an arcuate contact plate 85b correlated to the seven contact positions of contact plate 86 for the attitude circle switch arm 82 which omits a contact at the ILS position. This contact arrangement is effective to energize a two-position receiver synchro 91 through switch arm 81 over branch line BR-1, contact plate 85b and branch line BR-2 at one predetermined voltage during movement of pointer 80 to the first seven flight mode positions preceeding the ILS position so as to position receiver synchro 91 to hold plate 26 in position to display the attitude circle reticle 92 as switch arm 82 engages its respective contacts 86a to 86g and to energize receiver synchro 91 through switch arm 81 over branch line BR-3, contact 85a and branch line BR-2 at a second predetermined voltage when pointer 80 reaches the ILS position so as to rotate receiver synchro 91 to its second position to shift plate 26 into position to display the ILS circle reticle 44 when switch arm 82 moves to the eighth flight mode or ILS position disconnecting branch line BR-1 from switch arm 82.

As best seen in FIG. 8, attitude circle reticle 92 is centered in an auxiliary plate 93 slidingly mounted on trackways 94 formed on the siderails of a rectangular open ended frame 95 which are in turn lengthwise slidingly mounted on trackways 96 formed on plate 26. A receiver snychro 97 mounted on one of the siderails of frame 95 has its rotor drive connected to auxiliary plate 93 through rack and pinion 98 adapting auxiliary plate 93 for relative lengthwise movement with respect to frame 95 causing the attitude circle image D to assume predetermined positions vertically with respect to the horizon line image H as will be more fully explained. Frame 95 is in turn drive connected through rack and pinion 99 to the rotor of a receiver synchro 101 mounted on plate 26 and slaved to the pitch autosyn 102 (FIG. 7) of the aircraft's gyro horizon instrument through synchro 101 and branch line BR-4 to cause frame 95 and auxiliary plate 93 to move as a unit in a direction to impart to the attitude circle image D follower movement correlated to the instantaneous in flight movements of the horizon line image H in its preset nose attitude relation to horizon line image H. It will be appreciated, therefore, that this dual trackway construction will enable the attitude circle to be selectively moved from its lengthwise centered position in frame 95, corresponding to the actual nose position of the aircraft in level flight, in both directions to position the attitude circle to establish prescribed nose-up and nose-down flight attitudes in accord with the mode of flight selected by pilot actuation of flight mode selector switch 31 as will now be explained.

Assuming the aircraft is on the runway about to takeoff the pilot actuates switch 30 to energize the system. The gyro horizon instrument of the aircraft, which is always operative, will indicate the at rest attitude of the aircraft relative to the actual horizon and through the pitch autosyn 102 and bank autosyn 103 (FIG. .7) slaving the horizon line reticle plate 27 and the revolving horizon line etched plate 27a to the gyro horizon instrument will position the horizon line image H in its proper position in the display. At the same time, the receiver synchro 101 which is connected through branch line BR-4 (FIGS. 7 and 8) to the pitch autosyn 102 will be energized shifting frame 95 and auxiliary plate 93 as a unit in slaved fashion to position the attitude circle 92 to a corresponding position relative to the actual horizon. The pilot then switches mode selector switch 31 to the "takeoff" position and visually checks window 104 of switch 31 which should display the words "takeoff." In this position of switch 31, arm 81 of switch 31 will engage contact plate 85b and connect receiver synchro 91 to power source 87 over branch line BR-1 and BR-2 establishing voltage to shift plate 26 to introduce the attitude circle 92 into the display and arm 82 of switch 31 will engage contact 86a (FIG. 8) and connect receiver synchro 97 to power source 87 over branch line BR-5 and resistence line R-1 establishing the prescribed maximum voltage to shift auxiliary plate 93 relative to frame 95 upwardly as seen in FIG. 8 to engage upper spring biased detent ball 105 carried in frame 95 in the lowermost socket of the upper group of detent sockets 106. This relative positioning of auxiliary plate 93 in frame 95 is predetermined by design to establish the prescribe take off nose-up attitude position of attitude circle D relative to its level flight position for the aircraft.

At the same time, switch arm 77 (FIGS. 9 and 15) will engage contact 83a of switch plate 83 and switch arm 79 will engage contact 84a of switch plate 84 to impose biasing voltages of respective predetermined value over resistance lines R-1a and R-1b on the synchrocircuits connecting airspeed synchros 68 and 71 and vertical speed synchros 69 and 72 through leads 76 and 78 respectively to establish a bias voltage on these synchrocircuits to assure lateral alignment of the airspeed image C and vertical speed image B with the opposite wings of small airplane image A only when the prescribed airspeed and vertical speed for takeoff is reached. As a result of the positioning of these four switch arms in their respective takeoff positions, the system of this invention is preset by the pilot before takeoff to impart to the pilot graphically and without mental calculations instantaneously during takeoff any departure from optimum takeoff flight conditions insofar as nose attitude, airspeed and vertical speed are concerned.

Simultaneously and without any need of pilot attention, the horizon line image H will be moving in the display relative to the small airplane image A to impart to the pilot graphically and without mental calculations instantaneously during takeoff any departure from optimum level flight. It follows, therefor, that this system assures the pilot visually through the display on screen 20 exactly how his takeoff compares to optimum prescribed takeoff flight conditions for the plane he is flying. As a consequence, a trained pilot can execute a near perfect takeoff through visual observation even though changing ambient cloud conditions obscure normal visual observations of the actual horizon and landmarks observed in normal visual reference flight.

Upon completion of takeoff, determined preferably by reference to the altitude display F on screen 20 as hereinafter pointed out, the pilot shifts switch 31 to its "Climb" position. This moves switch arms 77, 79, 81 and 82 clockwise as viewed in FIGS. 13 and 15 to respectively engage contacts 83b, 84b, plate 85b further along in a clockwise direction, and contact 86b. In this position of switch 31, receiver synchro 91 remains energized to maintain the attitude circle reticle 92 in the display through branch line BR-1, contact plate 85b, switch arm 81 and branch line BR-2; receiver synchro 97 will be energized at a lesser voltage over resistance line R-2, contact 86b, switch arm 82 and branch line BR-5 to shift plate 93 in a downward direction relative to frame 95 as viewed in FIG. 8 to engage spring biased detent ball 105 in the center socket of the upper group of detent sockets 106; switch arms 77 and 79 engage contacts 83b and 84b connected to power source 87 through respective resistance lines R-2a and R-2b to impose biasing voltages of respective different predetermined value on the synchrocircuits connecting airspeed synchros 68 and 71 and vertical speed synchros 69 and 72 through leads 76 and 78 respectively to establish a bias voltage on these synchrocircuits to assure lateral alignment of the airspeed image C and vertical speed image B with the opposite wings of small airplane image A only when the prescribed airspeed and vertical speed for climbing is reached. The attitude circle reticle 92 will then be positioned to display attitude circle D in its prescribed climbing nose-up attitude position relative to its level flight position for the aircraft.

Upon reaching the flight plan cruising attitude, determined preferably by reference to the altitude limits display F on screen 20 as hereinafter pointed out, the pilot shifts switch 31 to "Cruise" position. This moves switch arms 77, 79, 81 and 82 clockwise as viewed in FIGS. 13 and 15 to respectively engage contacts 83d, 84d, plate 85b further along in a clockwise direction, and contact 86d. In this position of switch 31, receiver synchro 91 remains energized to maintain the attitude circle reticle 92 in the display through branch line BR-1, contact plate 85b, switch arm 81 and branch line BR-2; receiver synchro 97 will be energized at a lesser voltage over the center lead of three lead resistance line R-3, contact 86d, switch arm 82 and branch line BR-5 to shift plate 93 downward relative to frame 95 into its centered position illustrated in FIG. 8 to engage both spring pressed detent balls 105 in the outermost sockets of the respective upper and lower groups of detent sockets 106; switch arms 77 and 79 engage contacts 83d and 84d connected to power source 87 through respective resistance lines R-4a and R-4b to impose biasing voltages of respective different predetermined value on the synchrocircuits connecting airspeed synchros 68 and 71 and vertical speed synchros 69 and 72 through leads 76 and 78 respectively to establish a bias voltage on these synchrocircuits to assure lateral alignment of the airspeed image C and vertical speed image B with the opposite wings of small airplane image A only when the airspeed and vertical speed (zero vertical speed) prescribed for cruising is reached. The attitude circle reticle 92 will then be positioned to display attitude circle D in its prescribe level flight nose attitude position, the cruising nose position prescribed for the aircraft.

Referring for the moment to FIGS. 8 and 13, it will be noted that the 4 and 8 o'clock positions of switch 31 are marked "Pattern" and that the corresponding contacts 86c and 86f of switch plate 86 or connected to power source 87 through the respective outer leads of three lead resistance line R-3. It will be appreciated, therefor, that the attitude circle reticle 92 will be shifted to the prescribed level flight nose attitude position when switch 31 is shifted to these two additional positions. Since switch arm 81 remains in engagement with contact plate 85b in these two switching positions, attitude circle D will be displayed in level flight nose position in these switch positions also. This is as it should be for small aircraft since pattern flying, usually used in leaving and approaching busy airports, requires maintenance of level flight at assigned attitudes. In the case of pattern flying high performance aircraft which have large variations in airspeed and nose pitch attitude between high speed cruise and low speed pattern flying, biasing resistances of appropriate value tailored to the aircraft can be inserted in the branch lines between resistance line R-3 and the respective contacts 86e and 86f to accommodate such variations. In these two positions switch arms 77 and 79 will engage their respective contacts 83c—83f and 84c—84f connected to power source 87 respectively over resistance lines R-3a, R-6a and R-3b, R-6b to impose respective biasing voltages of predetermined value on the synchrocircuits connecting airspeed synchros 68 and 71 and vertical speed synchros 69 and 72 through leads 76 and 78 to establish a bias voltage on these synchrocircuits to assure lateral alignment of the airspeed image C and vertical speed image B with the opposite wings of airplane image A only when the airspeed and vertical speed (zero vertical speed) prescribed for pattern flying of the aircraft is reached.

When switch 31 is set to its "Descent" and "Final" positions similar circuits are established through switch arms 77, 79, 81 and 82 to respectively connect (1) lead 76 to power source 87 through contacts 83e and 83g, which is a two-position contact plate, and resistance lines R-5a and R-7a and lead 78 to power source 87 through contacts 84e and 84g, which is also a two-position contact plate, and resistance lines R-5b and R-7b to impose respective biasing voltages on their related synchrocircuits heretofore described to assure lateral alignment of the airspeed image C and vertical speed image B with the opposite wings of airplane image A when the respective airspeed and vertical speed prescribed respectively for descent and final approach flying is reached; (2) synchro 91 to power source 87 through branch line BR-2, contact plate 85b and respective and branch line BR-1 to maintain attitude reticle 92 in the display; and (3) synchro 97 through branch line BR-5 and respective contacts 86e and its resistance line R-4 and contact 86g and its resistance line R-5 to apply the respective lesser voltages to synchro 97 to shift plate 93 downwardly relative to frame 95 below its centered position illustrated in FIG. 8 to engage the lower spring pressed detent ball 105 respectively in the uppermost socket of the lower group of detent sockets 106 to establish the descent nose-down attitude position of attitude circle D relative to its level flight position for the aircraft and the center socket of the lower group of detent sockets 106 to establish the final or landing glide slope nose-down attitude position of attitude circle D relative to its level flight position for the aircraft.

When switch 31 is shifted to its "ILS" position, switch arm 77 and 79 remain engaged with their respective contact plates 83g and 84g, switch arm 81 leaves contact plate 85b and engages contact 85a, and switch arm 82 engages dead contact 86g disconnecting switch arm 82 from resistance lines R-1 through R-5 and deenergizing branch line BR-5 and synchro 97. In this position of switch 31, switch arm 81 engaging contact 85a imposes upon synchro 91 the alternate voltage from power source 87 provided over branch line BR-3, contact 85a, arm 81 and branch line BR-2 causing plate 26 to be shifted to the left as seen in FIG. 8 to remove attitude circle reticle 92 from its display position and to move ILS reticle 44 into its place. At the same time, switch arm 77 engages plate contact 83g at its 11 o'clock position and switch arm 79 engages plate contact 84g at its 11 o'clock position to impose the lesser biasing voltages established by resistance lines R-7a and R-7b respectively on the synchrocircuits connecting airspeed synchros 68 and 71 and vertical speed synchros 69 and 72 through leads 76 and 78 to assure lateral alignment of the airspeed image C and vertical speed image B with the opposite wings of airplane image A only when the airspeed and vertical speed prescribed for the final glide slope of the aircraft is reached. The ILS circle reticle 44 is directly slaved through receiver synchros 47 and 48 and their respective transmitter synchros 111 and 112 energized respectively through leads 113 and 114 connected to the aircraft's standard glide slope receiver and the aircraft's standard localizer receiver (not shown) to cause plate 115 mounting reticle 44 to shift along trackways 94 of frame 116 slidingly mounted on trackways 96 formed on plate 26. It will be appreciated, therefore, that the image of reticle plate 44 projected on screen 20 in place of attitude circle image D will assume a position relative to the horizon line image H and the small airplane image A corresponding angularly and directionally to the ILS landing system signals transmitted from the airport being approached to fix the optimum final approach glide slope and its bearing to effect a blind landing. Since the optimum landing airspeed and vertical descent speed as well as the instantaneous attitude of the aircraft to the actual horizon prescribed for the aircraft in landing can be properly maintained by the pilot by reference to the airspeed image C, the vertical speed image B, the horizon line image A, and the small airplane image A simultaneously displayed on screen 20 in relation to the projected image of the ILS reticle plate 44, the present system enables the pilot to visually check his instrument landing approach at all times assuring an optimum blind landing.

The four basic components of the display so far described, namely, the Horizon Line, the Small Airplane, the Airspeed Line, and the Vertical Speed Line are the basic elements of the graphic visual display. These are all familiar to the pilot. These indications are presented in the form of a straight line and a circle. The straight line consists of the wings of the Small Airplane and the lateral extensions of that line by the Airspeed and Vertical Speed Lines which pivot about either end of the wings. This gives the pilot a reference which enables him to constantly be aware of airspeed and vertical speed in terms of the desired speeds, and any variation from the desired speeds, without having to look at, focus upon, read or interpret any dials or numbers. This is accomplished without distraction from normal visual reference to the outside world or mental correlation of horizon line, and small airplane pitch and bank relationship displays proposed in prior "heads-up displays" since the display of the present invention actually coordinates airspeed and vertical speed with aircraft attitude, and provides a display which is dynamically, functionally and pictorially related to the attitude and flight path of the aircraft itself.

The System is a "fly to" system in its entirety. Pilots will find that using the attitude circle and the ILS circle will be easy and natural because it involves the principle of always aiming for the "bull's eye."

The simplicity of the basic System design makes it possible to additionally introduce and correlate information concerning altitude, the ILS approach, directional navigation, and yaw without the use of dials or numbers, and without adding any "clutter" or distraction to the basic display of attitude, airspeed, and vertical speed as will now be pointed out.

THE ALTITUDE LIMITS DISPLAY. FIG. 11 illustrates the altitude limits display reticle plate 24 and FIG. 17 illustrates the control circuitry for its operation. Referring for the moment to FIG. 11, the reticle plate 24 comprises a rectangular frame 121 fixedly positioned in housing 50 and provided with respective upper and lower, transparent colored shutters 123 colored blue and 124 colored red mounted to slide in opposing trackways 125 formed in the side rails of frame 121. Upper shutter 123 is connected through rack bar 126 guided in right-hand trackway 125 to the drive pinion 127 of receiver synchro 128 while lower shutter 124 is connected through rack bar 129 guided in right-hand trackway 125 to the drive pinion 127 of receiver synchro 131 for independent inward movement from their respective illustrated "home" positions, which are predetermined to assure that the images of the inner shutter edges 132 coincide with the upper and lower edges of screen 20 when the altitude limits switch is in its "Cruise" position, the normal "home" position of switch 35. In this position of switch 35, a null position of transmitter synchro 133 is established by null holding springs NH, electromechanical clutch CL (FIG. 17) being deenergized to break the mechanical connection between the rotor of synchro 133 and the common drive shaft and pinion 130 provided to selectively drive transmitter synchro 133 from the hundreds of feet shaft HF of the aircraft's altimeter and constantly drive transmitter synchro 133a permanently drive connected to shaft HF. Transmitter synchro 133 in its null position imposes a voltage on receiver synchros 128 and 131 sufficient to maintain shutters 123 and 124 in their "home" positions over branch line BR–6, contact $C^1$ of switch plate 134 of switch 35, switch arm 135, lead 136 of receiver synchro 128, lead 137 of receiver synchro 128, switch arm 138, contact $C^1$ of switch plate 139 of switch 35, branch line BR–7, contact $C^1$ of switch plate 141, switch arm 142, lead 143 of receiver synchro 131, lead 144 of receiver synchro 131, switch arm 145, contact $C^1$ of switch plate 146 of switch 35, branch line BR–8 and the grounded lead of transmitter synchro 133. While branch line BR–7 is connected at all times through branch line BR–9, switch arm 147, contact $C^1$ of switch plate 148 of switch 35 and branch line BR–10 to the pushbutton contactor 149 of pushbutton switches PB–1, PB–2, PB–3, which is spring biased together with contactor 149a to "home" or "off" position to normally maintain contactors 149 and 149a engaging the dead "off" position contacts $C^1$ of switch plates 151 and 151a respectively disrupting the biasing circuitry through pushbutton contactor 194 and the clutch energizing circuitry through contactor 149a until such time as the pilot actuates one of the pushbuttons PB–1, PB–2, or PB–3 to select an altitude limit to be maintained in flight.

Assuming that a prescribed cruising altitude has been reached, the pilot need only press one of the push buttons to select the desired limit variation he wishes to maintain, for example, the 100′ button PB–3. Actuation of this button accomplishes two things simultaneously, it shifts contactor 149 to engage the 100′ contact of switch plate 151 and shifts contactor 149a to engage the 100′ contact of switch plate 151 imposing a biasing voltage from power source 87 of predetermined value established by resistance line R–100 through contactor 149 and branch line BR–10 in opposite directions over branch line BR–7 to receiver synchros 128 and 131 and applies the full voltage of power source 87 over line L–100 through contactor 149a and branch line BR–11 to electromechanical clutch CL to couple transmitter synchro 133 with its rotor in the null position to drive shaft and pinion 130 at the instantaneous angular position of the hundreds of feet shaft HF of the aircraft's altimeter. Since the other transmitter synchro 133a connected to the hundreds of feet shaft HF is not electrically connected to receiver synchros 128 and 131 at this time and the transmitter synchros 153 and 154, respectively drive connected to the thousands of feet shaft T and ten thousands of feet shaft TT of the aircraft's altimeter, are not electrically connected to receiver synchros 128 and 131 at this time, receiver synchros 128 and 131 will be responsive only to the angular variations in the hundreds of feet shaft HF on this setting of switch 35. If the aircraft climbs sufficiently to attain an altitude 100′ above the prescribed cruise altitude, signals transmitted by transmitter synchro 133 will be sufficiently increased in voltage to overcome the biasing voltage imposed on receiver synchro 128 causing directional rotation of the rotor of synchro 128 to shift upper shutter 123 downwardly onto screen 20 casting a blue shadow across the top of the screen of a vertical height proportional to the gain in altitude beyond the 100′ upward variation. While this same signal voltage will be applied to receiver synchro 131 it will be directionally additive to the biasing voltage imposed through branch line BR–9 further assuring the positioning of shutter 124 in its "home" position. In event the aircraft loses altitude, transmitter synchro 133 will transmit signals of sufficiently decreased voltage to lessen the voltage through receiver synchro 131 causing directional rotation of the rotor of synchro 131 to shift lower shutter 124 upwardly onto screen 20 casting a red shadow across the bottom of the screen of a vertical height proportional to the loss in altitude beyond the 100′ downward variation. It will be appreciated from the foregoing description of this setting of the altitude limits switch 35 and its pushbutton PB–3, that transmitter synchro 133 and receiver synchros 128 and 131 connected as heretofore pointed out by switch arms 135, 138, 142, 145 and 147 will be operative to preselect the resistance necessary to provide a bias voltage to offset the signal voltage of any one of the disclosed altitude variations upon actuation of pushbuttons PB–1, PB–2, or PB–3 and that by substitution of different appropriate resistances between power source 87 and switch plate 151 any desired set of three altitude limits may be built into the system.

When the altitude limits display is to be used to warn the pilot of arrival at a specified altitude, preset by pilot, pointer 150 of switch 35 is turned to the appropriate identified position and digital selector knob 35a of any suitable construction is actuated to set the three drums, DH (hundreds of feet drum), DT (thousands of feet drum) and DTT (tens of thousands of feet drum) to the preselected altitude, for example 34,600 feet as shown in FIGS. 13 and 17. Assuming the aircraft is taking off to ascend to a cruising altitude of 34,600 feet and that switch 31 has been operated to effect an optimum takeoff and is set to its "Climb" position as heretofore described, pointer 150 of switch 35 is moved to the "Climb To" position engaging switch arms 135, 138, 142, 145, and 147 with their respective contacts $C^2$. Since contact $C^2$ of switch plate 148 is a dead contact, pushbuttons PB–1, PB–2, and PB–3 will be disconnected from receiver synchros 128 and 131 and the digital selector drum circuits connected serially will be cut into the altitude synchro circuits through branch line BR–13. Digital selector switch knob 35a having been actuated to set the biasing circuitry to impose biasing voltage through branch line BR–13 equal to combined signal voltage of transmitter synchros 133a, 153 and 154 at this preselected altitude (see FIG. 17), the altitude limits display components are conditioned to warn the pilot when the preselected cruise altitude is reached. This setting of the components of switch 35 connects receiver synchro 128 for upper shutter 123 to receive the combined signal voltages from all three transmitter synchros 133a, 153 and 154 over branch line BR–12, to which all three transmitter synchros are connected at 163, contact $C^2$ of switch plate 134, switch arm 135 and lead 136 and to power source 87 supplying the predetermined combined biasing voltage produced through the three connected digital selector resistances for the selected 34,600 foot altitude over lead 137, switch arm 138, contact $C^2$ of switch plate 139, branch line BR–13, contactor 156, contact 3 of contact plate 159, resistance line R–3, branch line BR–14, contactor 157, contact 4 of contact plate 161, resistance line R–4, branch line BR–15, contactor 158, contact 6 of contact plate 162, resistance line R–6 and output lead 164 of power source 87. At the same time, receiver synchro 131 for lower shutter 124 is directly connected to power source 87 over branch line BR–17, contact $C^2$ of switch plate 141, switch arm 142, lead 143, lead 144, contact $C^2$ of switch plate 146 to ground line 165 to maintain receiver synchro 131 positioned to hold shutter 124 in its "home" position. As the altimeter shafts rotate to indicate arrival at the preselected altitude, the transmitted signal voltage increases until it overbalances the biasing voltage for the preselected altitude imposed on receiver synchro 128 causing shutter 123 to move inwardly displaying a blue colored band along the top of screen 20 signaling the pilot that the assigned cruising altitude has been reached. The pilot then turns switch pointer 150 to the "Cruise" position and actuates the desired pushbutton PB–1, PB–2, or PB–3 to establish the cruising altitude limits setting to maintain the prescribed cruising altitude with reference to the altitude limits display as previously described.

In descending to a preselected altitude, for example, to the assigned altitude for landing approach pattern flying, switch pointer 150 is moved to the "Descend To" position and the assigned pattern flying altitude is set on the digital selector as heretofore described. In such a setting, assuming a descent to 4,000 feet, drums DH and DTT of the digital selector will be set to zero engaging contactors 156 and 158 with the O contacts of their respective contact plates 159 and 162 and drum DT will be set to 4 engaging its contactor 157 with contact 4 of its contact plate 161. This setting of switch 35 will in turn engage switch arm 135 with contact $C^3$ of switch plate 134, switch arm 138 with contact $C^3$ of switch plate 139, switch arm 142 with contact $C^3$ of switch plate 141, switch arm 145 with arcuate plate contact $C^3$ of switch plate 146, and switch arm 147 with dead arcuate plate contact $C^3$ of switch plate 148 thereby again disconnecting pushbuttons PB–1, PB–2, and PB–3 from receiver synchros 128 and 131. In this setting, receiver synchro 128 for upper shutter 123 is directly connected to power source 87 over branch line BR–18, arcuate plate contact $C^3$ of switch plate 139, switch arm 138, lead 137, lead 136, arcuate plate contact $C^3$ of switch plate 134, to ground lead 166 to maintain receiver synchro 128 positioned to hold shutter 123 in its "home" position, and receiver synchro 131 is connected to the three signaling transmitter synchros 133a, 153 and 154 and to the digital selector circuitry to establish the required biasing voltage to effect inward movement of shutter 124 to display a red colored band on screen 20 when the declining signal voltage of the assigned altitude is reached. The circuitry for accomplishing this is branch line BR–12 from the transmitter synchros 133a, 153, 154 to branch line BR–19 connected at 167 to branch line BR–12, arcuate plate contact $C^3$ of switch plate 141, switch arm 142, lead 143, lead 144, switch arm 145, arcuate plate contact $C^3$ of switch plate 146, branch line BR–20 to its connection at 168 to branch line BR–13, branch line BR–13 to digital selector contactor 156, the zero contact of contact plate 159, the resistance free line 169 leading to branch line BR–14, branch line BR–14, contactor 157, contact 4 of contactor plate 161, resistance line R–4, branch line BR–15, contactor 158, the zero contact of contact plate 159, the resistance free line 171 leading to lead 164 of power source 87. The only resistance connected in the biasing circuitry is resistance R–4 leading to contact 4 of switch plate 161 associated with the thousands of feet drum DT. Since this resistance is of a predetermined value to produce a biasing voltage equal to the signal voltage produced when the aircraft's altimeter indicates 4,000 feet, shutter 124 will move inwardly displaying a red colored band along the bottom of screen 20 signaling the pilot that the assigned pattern flying altitude has been reached. By suitable setting of the digital selector to introduce the respective predetermined resistance into the biasing circuitry, the pilot can preselect any altitude attainable by the aircraft in one hundred foot increments between 100 feet and 59,900 feet as his "Climb To" or "Descent To" target and the altitude limits display will operate as heretofore described to signal arrival at the preselected altitude. Additionally the altitude setting displayed in the drum windows of the digital selector switch serves as a visual check-back reference to the last clearance altitude given the pilot by air traffic control or dictated by his flight plan.

When switch arm 150 is moved to its "ILS MIN" position, receiver synchros 128 and 131 will be connected in the same way that they are connected in the "Descend To" position since the respective arcuate plate contacts $C^3$ extend along their respective switch plates sufficiently to cover both of these switch positions. Since the purpose of the altitude limits display in this setting is to warn the pilot of arrival at the minimum altitude during his final approach to assure a safe landing while maintaining the ILS glide slope depicted on screen 20 as a result of the setting of switch 31 to its ILS position, drums DTT and DT will be set to zero and drum DH will be set to the minimum landing approach altitude, say 200 feet. In such a setting, the biasing voltage from power source 87 to receiver synchro 131 will be applied over lead 164, resistance line R–2 and contact 2 of contact plate 162, contactor 158, branch line BR–15, the resistance free line 172 leading to the O contact of contact plate 161, contactor 157, branch line BR–14, resistance free line 169 leading to the O contact of contactor plate 159, contactor 156, branch lines BR-13 and BR-20, arcuate contact plate C³ of switch plate 146, switch arm 145 and lead 144. When the aircraft descending along the ILS glide slope established through switch 31 reaches the minimum 200 foot altitude, shutter 124 will move inwardly displaying a red colored band along the bottom of screen 20 signaling the pilot that he has reached his minimum altitude.

It will be appreciated from the preceding description that the altitude limits display provides the pilot with instant visual confirmation of the aircraft's altitude in all modes of flight without shifting his view from screen 20 and correlates this altitude information in the display along with the other critical flight information needed by him to assure near perfect flying.

THE DIRECTION LINE DISPLAY. The direction line reticle plate 25 shown in FIG. 10 comprises a transparent rectangular plate laterally slidably supported in housing 50 and fixedly mounting in its center a circular transparent disc 175 having a dimetrical line 176 etched therein. Disc 175 is fixed in place in plate 25 in any suitable manner to dispose line 176 at right angles to the path of movement of plate 25. The lower edge of plate 25 as seen in FIG. 10 is provided with rack teeth 177 meshingly engaged with rack drive pinion 178 fixed to the rotor shaft 179 of receiver synchro 181 fixedly secured to housing 50. Receiver synchro 181 is provided with leads 182 and 183 adapting it for connection through multithrow multipole direction line switch 33 into the autosyn circuitry of FIG. 16 to alternately (1) directly connect receiver synchro 181 over branch line BR-21 and BR-22 to power source 87 and ground to drive plate 25 to a position to remove the direction line image E from the display when s switch 33 is in its "off" position and (2) to connect the lead 182 of receiver synchro 181 through branch line BR-23 to arm 186 of potentiometer 187 powered through lead 185 from power source 87 and lead 183 of receiver synchro 181 through branch line BR-24 to the other arm 188 of potentiometer 187 to energize receiver synchro 181 in accord with the difference in potential between the two potentiometer arms. Potentiometer arm 186 is directly drive connected to the conventional compass bug (not shown) employed to manually set the directional heading specified by the flight plan on the aircraft's compass and, therefore, imposes a predetermined biasing voltage on receiver synchro 181 over branch line BR-23 and lead 182 for each setting of the compass bug. Potentiometer arm 188 is in turn directly drive connected through shaft 189 and gear train 190 to the rotor shaft of receiver synchro 191 alternately slaved (1) to transmitter synchro 192 driven by the pointer shaft 193 of the aircraft's compass 194 over lead 195 and branch line BR-25, (2) to the output 196 of the aircraft's omnireceiver (not shown) over lead 195 and branch line BR-26, or (3) to the output 197 of the aircraft's localizer receiver (not shown) over lead 195 and branch line BR-27 so the signal voltage variations in the opposite directions from the preset potentiometer arm 186 established by the instantaneous bearing of the aircraft indicated by one or the other of the aircraft's directional indicating instruments will be imposed oppositely on receiver synchro 181 over branch line BR-24 and lead 183. The voltage difference between the signal voltage and biasing voltage rotates receiver synchro 181 and its rack pinion 178 in one direction or the other to a degree depending upon the directional variation of the aircraft from the preset course heading causing direction line image E to move to the right or left of nose point 32 (FIG. 2) warning the pilot of any directional heading variation. The respective settings of switch 33 automatically establishes the circuitry as will now be pointed out.

Referring for the moment to switch 33, it comprises an insulated shaft 198 fixedly mounting pointer 199 at its upper end (FIG. 13) and also fixedly mounts respective switch arms 201, 202 and 203 in axially spaced angular correlation with pointer 199 and respect switch plates 204, 205 and 206 mounting respective contacts C¹, C², C³ and C⁴ (FIG. 16). In the "off" position, switch arm 201 engages contact C¹ of switch plate 201 connected to ground lead 207, switch arm 202 engages contact C¹ of switch plate 205 connected to lead 208 of power source 87 and switch arm 203 engages dead contact C¹ of switch plate 206. This switching isolates the potentiometer circuitry and applies the full voltage of power source 87 to receiver synchro 181 through lead 208, contact C¹ of switch plate 205, switch arm 202, branch line BR-21, lead 183, lead 182, branch line BR-22, switch arm 201, contact C¹ of switch plate 204, and ground lead 207 to rotate rack pinion 178 to shift plate 25 to the right as seen in FIG. 10 sufficiently to remove the direction line image E off of screen 20.

When the aircraft is in flight and it is desired to maintain flight along a predetermined compass bearing, pointer 199 is shifted to the "Compass" position and the compass bug is set to the predetermined heading shifting potentiometer arm 186 around its pivot axis to a position determined by the compass bug setting to impose the prescribed bias voltage for that setting on receiver synchro 181 from power source 87 over lead 185, the portion of potentiometer resistance PR between potentiometer arm 186 and lead 185, potentiometer arm 186, branch line BR-23, and lead 182. In this "Compass" setting of pointer 199, switch arm 201 and 202 engage their respective dead contacts C² breaking the ground connection of branch line BR-22 and the direct connection to power source 87 over branch line BR-21 leaving receiver synchro 181 connected to potentiometer arms 186 and 188 only and switch arm 203 connects transmitter synchro 192 driven by compass pointer shaft 193 through branch line BR-25, contact C² of switch plate 206, switch arm 203, lead 195 of receiver synchro 191 and its ground lead to slave potentiometer arm 188 to the aircraft's compass pointer shaft to effect operation of the direction line reticle plate 25.

Should the pilot decide to fly an instrument course or be engaged in making an instrument landing approach, he merely sets the compass bug to the appropriate heading and switches pointer 199 of switch 33 to either its VOR or LOC position, depending upon the aircraft's instrumentation or the signal being received, to engage switch arms 201, 202 and 203 with their respective contacts C³ or C⁴. Since contacts C³ and C⁴ of switch plates 204 and 205 are dead contacts like their contacts C², the ground connection of branch line BR-22 and the direct connection to power source 87 over branch line BR-21 will again be broken and leads 182 and 183 of receiver synchros 181 will again be connected to potentiometer arms 186 and 188 only. In these alternate settings of switch 33, potentiometer arm 188 will be slaved through receiver synchro 191, lead 195, and switch 203 either through contact C³ of switch plate 206 to branch line BR-26 connected to the output 196 of the aircraft's omnireceiver or through contact C⁴ of switch plate 206 to branch line BR-27 connected to the output 197 of the localizer receiver to impose the directional signal voltages from these instruments on receiver synchro 191 to control the operation of potentiometer arm 188.

From the foregoing description of the direction line display, it will be appreciated that the components of this invention can be readily set at the pilot's option to incorporate an instantaneous visual display of course or bearing variations into the display on screen 20.

THE YAW DISPLAY. The yaw display reticle plate 23 of FIG. 12 comprises a rectangular open center frame 211 slidably mounted in housing 50 for movement at right angles to the longitudinal axis of the aircraft. At the laterally opposed ends of the center opening of frame 211, respective transparent shutters 212 and 213 of a distinctive green color are fixedly attached so that their opposing inner edges 214 will coincide with the respective side edges of screen 20 when frame 211 is laterally centered with respect to the nose point 32 of the small airplane image of reticle plate 23 as heretofore described. The under face of the lower frame rail 216 is provided with downwardly directed rack teeth 217 adapted to mesh with rack pinion 218 fixed to the rotor shaft of a receiver synchro 219 fixedly attached to housing 50 with its axial centerline normal to the direction of movement of frame 211 and lying in a vertical plane containing nose point 32 of the small airplane reticle plate 23 to establish the normal position of frame 211, the position prescribed when the aircraft's axial centerline coincides with the "in flight" heading of the aircraft.

Receiver synchro 219 is directly slaved through lead 221, "on" contact $C^2$ and switch arm 222 (FIG. 12) fixedly mounted on shaft 223 in angular correlation to pointer 224 (FIG. 13) to the output lead 225 of the conventional yaw rate gyro unit indicated by box 226 (FIG. 12) provided on larger aircraft for controlling the automatic pilot. Under balanced flight conditions, the output signal of the yaw rate gyro unit imposes a voltage on receiver synchro 219 of a value to position rack pinion 218 so plate 23 is in its normal centered position. When the yaw rate gyro unit responds to skidding or slipping in flight, the output signal voltage is varied directionally to respectively drive receiver synchro 219 to move frame 211 inwardly from the right to cause shutter 215 to display a green band along the right edge of screen 20 to indicate skidding or sliding to the right or to move inwardly from the left to cause shutter 214 to display a green band along the left edge of screen 20 to indicate skidding or sliding to the left.

If desired the alternate Yaw display reticle of FIG. 14 may be employed in lieu of that of FIG. 12. This alternate reticle comprises a laterally elongated, open centered frame 211a fixedly mounted in housing 50 and in turn fixedly mounting a vertically upstanding green colored vane 215 on a pivot shaft 215a journaled in the opposing laterally directed rails of frame 211a at the respective center points of the rails. A pinion gear 217a fixedly connected to shaft 215a and meshed through drive pinion 218a fixed to the rotor shaft of receiver synchro 219 maintains vane 215 in its vertical upright position under balanced flight conditions to display Yaw display image Y on screen 20 (see FIG. 3) to indicate balanced flight. When skidding or sliding to the right occurs, the signal over line 331 from the aircraft's yaw rate gyro will energize synchro 219 in a direction to pivot vane 215 clockwise as seen in FIG. 14 to broaden image Y to the right (see FIG. 4) indicating the degree of skidding or sliding by the width of the display. Similarly skidding or sliding to the left will energize synchro 219 to pivot vane 215 counterclockwise to broaden image Y to the left (see FIG. 5).

VERTICAL SPEED LINE AND AIR SPEED LINE ADJUSTMENT. The vertical speed line adjustment switch 36 and air speed line adjustment switch 37 are both multiple throw switches having switch arms 231 fixed to their respective shafts 232 in correlated angular relation to their respective pointers 38 and 41 to engage rheostats 233 and 234 respectively (FIG. 13) connected to common power source 87 to impose biasing voltages of predetermined value depending upon their respective settings over respective leads 235 and 236 to receiver synchros 69 and 68 to establish the compensated vertical speed and air speed values as heretofore pointed out.

ADDITIONAL HORIZON LINE DISPLAY. A further safety feature can be provided by adapting the collimating projector to selectively additionally project the horizon line image H on the side windows of the cockpit when the pilot is executing a turn at night or in bad visibility to provide a guide to enable the pilot to accurately judge the relative position and flight path of another aircraft visible to him when the true horizon is obscured. When the other plane is above his plane it will appear above the horizon line image, when at the same altitude the other plane will appear on the horizon line image, when below the other plane will appear below the horizon line image.

It is to be understood that suitable amplifiers may be incorporated in any of the signal circuits where required to provide a signal of appropriate strength to actuate the respective synchro circuits, that on-off switch 30 is interposed between power source 87 and each of the control switches 31, 33, 34, 35, 36 and 37 to permit full shut down of the system when desired, and that the display could be created using other electrical components, such as electronic tubes or transistors for creating the displays to be projected on screen 20.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

I claim:

1. Apparatus for producing a simulated visual reference flying display and displaying it for use by aircraft pilots comprising a display screen fixedly mounted in the pilot's normal line of vision through the windshield; a collimated image forming and projection means fixedly mounted in the aircraft and focused to project multiple graphic images in correlated relation on the screen to visually depict to the pilot essential flight information to enable him to maintain optimum modes of flight at all times comprising:
   a. means fixedly related to the aircraft fuselage and forming a projected line airplane image on said screen composed of oppositely laterally aligned wing lines extending from a common centered arcuate fuselage line defining a center nose point;
   b. means arranged to form a projected air speed line image on said screen in position for pivotal movement around one wing end of said line airplane image;
   c. means arranged to form a projected vertical speed line image on said screen in position for pivotal movement around the other wing end of said line airplane image;
   d. means arranged to form a projected horizon line image on said screen in position for relative centered vertical planar and rotational movement on said screen with respect to said line airplane image and said air speed and vertical speed line images;
   e. means arranged to form a projected attitude circle line image on said screen in position for relative centered planar movement along the full length of the vertical centerline of said screen relative to said line airplane image and said air speed and vertical speed line images and for independent limited relative planar movement along the vertical centerline of said screen relative to the horizon line image; and
   f. means to respectively electrically slave items (b), (c), (d), and (e) to the aircraft's conventional:
      1. air speed instrument through first control circuitry including a flight mode selector switch selectively settable to apply a biasing voltage of predetermined value to said first control circuitry to cause said air speed line image to assume a position laterally aligned with said one wing of said line airplane image only when a predetermined optimum speed for the selected mode of flight is attained;
      2. vertical speed instrument through second control circuitry including said flight mode selector switch selectively settable to apply a biasing voltage of predetermined value to said second control circuitry to cause said vertical speed line image to assume a position laterally aligned with said other wing of said line airplane image only when a predetermined optimum speed for the selected mode of flight is attained.
      3. gyro horizon instrument through control circuitry including a first transmitter variably energized in response to the instrument indication of pitch attitude to impose a signal on a receiver effective to shift the horizon line image up and down over the screen in correlation to the aircraft's pitch attitude and a second transmitter variably energized in response to the instrument indications of bank attitude to impose a signal on a receiver effective to rotate the horizon line image around its center point over the screen in correlation to the aircraft's pitch attitude to the aircraft's bank attitude; and 4. through a first control circuit including said first transmitter and a receiver drive connected to slave said attitude circle line image to move up and down over the screen in correlated relation to the comparable movements of the horizon line image and through a second control circuit including said flight mode selector switch selectively settable to impose a biasing voltage of predetermined value therein to also cause said attitude circle image to assume a relative correlated position above or below the horizon line image corresponding to the optimum nose pitch attitude of the aircraft to the actual horizon for the selected selected mode of flight so the pilot through the aircraft's controls can control his flight by reference flying of the line airplane image to bring its nose point to the center of the attitude circle while maintaining (1) his air speed and vertical speed near optimum by noting and compensating for upward and downward swinging movements of the air speed line image and the vertical speed line image from lateral alignment and (2) near optimum flight by noting and compensating for nonparallelism of said line airplane image with respect to the horizon line image.

2. The combination of claim 1, wherein said means arranged to form a projected air speed line image comprises an elongated transparent member etched to form a light interruption line and pivoted at one end to said transparent plate means adjacent said one wing end of said line airplane image and synchrodrive circuitry including transmitter synchro means drive connected to the pointer shaft of the aircraft's air speed indicator, receiver synchro means slaving said pivoted transparent member for angular movement in accord with the signal transmitted by said transmitter synchro means, and flight mode selector switch means including varying resistance biasing circuits selectively connectable into said synchro drive circuitry to impose predetermined biasing voltages on said synchro drive circuitry effective to cause lateral alignment of said air speed line image with said one wing of said line airplane image only when the air speed prescribed for the selected mode of flight is attained by the aircraft.

3. The combination of claim 1, wherein said means arranged to form a projected vertical speed line image comprises an elongated transparent member etched to form a light interruption line and pivoted at one end to said transparent plate means adjacent said other wing end of said line airplane image and synchro drive circuitry including transmitter synchro means drive connected to the pointer shaft of the aircraft's rate of climb indicator, receiver synchro means slaving said pivoted transparent member for angular movement in accord with the signal transmitted by said transmitter synchro means, and flight mode selector switch means including varying resistance biasing circuits selectively connectable into said synchro drive circuitry to impose predetermined biasing voltages on said synchro drive circuitry effective to cause lateral alignment of said vertical speed line image with said other wing end of said line airplane image only when the vertical speed prescribed for the selected mode of flight is obtained by the aircraft.

4. The combination of claim 1 together with means arranged to form an altitude limits display on said screen alternately along the top of the screen to indicate that an upper altitude limit has been exceeded and along the bottom of the screen to indicate that a low altitude limit has been exceeded.

5. Apparatus for producing a simulated visual reference flying display fixedly mounted in position for viewing by the pilot comprising image forming means fixedly mounted in the aircraft to provide multiple graphic images in correlated relation to visually depict to the pilot essential flight information to enable him to maintain optimum flight at all times, said image forming means including:

a. means fixedly related to the aircraft fuselage and forming a line airplane image composed of oppositely laterally aligned wing lines extending from a common centered arcuate fuselage line defining a center nose point;

b. means arranged to form an air speed line image in position for pivotal movement around one wing end of said line airplane image;

c. means arranged to form a vertical speed line image in position for pivotal movement around the other wing end of said line airplane image;

d. means arranged to form an horizon line image in position for relative centered vertical planar and rotational movement with respect to said line airplane image and said air speed and vertical speed line images;

e. means arranged to form an attitude circle line image in position for relative centered planar movement along the full length of the vertical centerline of said display relative to said line airplane image and said air speed and vertical speed line images and for independent limited relative planar movement along the vertical centerline of said display relative to the horizon line image;

f. means arranged to form an altitude display image in position for planar movement inwardly from the top and the bottom of the display as the upper and lower altitude limits are respectively exceeded;

g. means arranged to form an ILS circle line image for relative planar movement laterally and from top to bottom of the display in response to the ILS signals;

h. means arranged to form a direction line image for planar movement laterally across the display;

i. means to respectively electrically slave items (b), (c), (d), (e), (f), (g), and (h) to:

1. the aircraft's conventional air speed instrument through first control circuitry including a flight mode selector switch selectively settable to apply a biasing voltage of predetermined value to said first control circuitry to cause said air speed line image to assume a position laterally aligned with said one wing of said line airplane image only when a predetermined optimum speed for the selected mode of flight is attained;

2. the aircraft's conventional vertical speed instrument through second control circuitry including said flight mode selector switch selectively settable to apply a biasing voltage of predetermined value to said second control circuitry to cause said vertical speed line image to assume a position laterally aligned with said other wing of said line airplane image only when a predetermined optimum speed for the selected mode of flight is attained;

3. the aircraft's conventional gyro horizon instrument through control circuitry including a first transmitter variably energized in response to the instrument indication of pitch attitude to impose a signal on a receiver effective to shift the horizon line image up and down over the screen in correlation to the aircraft's pitch attitude and a second transmitter variably energized in response to the instrument indications of bank attitude to impose a signal on a receiver effective to rotate the horizon line image around its center point over the screen in correlation to the aircraft's bank attitude;

4. said flight mode selector switch through a first control circuit including said first transmitter and a receiver drive connected to slave said attitude circle line image to move up and down over the screen in correlated relation to the comparable movements of the horizon line image and through a second control circuit including said flight mode selector switch selectively settable to impose a biasing voltage of predetermined value therein to also cause said attitude circle image to assume a relative correlated position above or below the horizon line image corresponding to the optimum nose pitch attitude of the aircraft to the actual horizon for the selected mode of flight so the pilot through the aircraft's controls can control his flight by reference flying of the line airplane image to bring its nose point to the center of the attitude circle while maintaining (1) his air speed and vertical speed near optimum by noting and compensating for upward and downward swinging movements of the air speed line image and the vertical speed line image from lateral alignment and (2) near optimum flight by noting and compensating for nonparallelism of said line airplane image with respect to the horizon line image;

5. the aircraft's conventional altimeter through a control circuit including said flight mode selector switch and suitable switch selected biasing resistances to cause said altitude display image to assume a position inwardly respectively from the top and the bottom of the display when the altimeter indications exceed the altitudes determined by the selected biasing resistances;

6. the output of the aircraft's ILS receivers through a control circuit including said flight mode selector switch to cause the ILS circle line image to follow the ILS signals; and 7. the aircraft's conventional directional navigational equipment through a control circuit including a multipole sector switch and a suitable variable biasing control to cause the direction line image to assume a position laterally in the display in correlation to the aircraft's heading.

UNITED STATES PATENT OFFICE
CERTIFICATE OF CORRECTION

Patent No. 3,574,283          Dated April 13, 1971

Inventor(s) William R. Albers

It is certified that error appears in the above-identified patent and that said Letters Patent are hereby corrected as shown below:

Address of Inventor should be -- 3615 Lido Place, Fairfax, Virginia -- instead of "3615 Libo Place, Fairfax, Virginia".

Title of Invention should be -- Anumeric Collimated Display Including Means For Projecting Elevation, Attitude and Speed Information -- instead of "Numeric Collimated Display Including Means For Projecting Elevation, Attitude and Speed Information".

Column 1, line 54, change "reference" to -- references --.

Column 6, line 9, change "horizOn" to -- horizon --.

Column 11, line 20, change "Descent" to -- Descend --.

Column 13, line 39, after "vertical" insert -- speed --.

Column 25, line 30, delete "s" after the word "when".

Column 27, line 37, change "331" to -- 221 --.

Column 29, line 6, claim 1, delete "aircraft's pitch attitude to the".

Column 29, line 20, claim 1, delete "selected" (second occurrence)

Signed and sealed this 14th day of September 1971.

(SEAL)
Attest:

EDWARD M. FLETCHER, JR.
Attesting Officer

ROBERT GOTTSCHALK
Acting Commissioner of Patents